US011781056B2

(12) United States Patent
Melbouci et al.

(10) Patent No.: US 11,781,056 B2
(45) Date of Patent: Oct. 10, 2023

(54) STABLE HIGH SOLIDS SLURRY COMPOSITIONS

(71) Applicant: KAO SPECIALTIES AMERICAS LLC, High Point, NC (US)

(72) Inventors: Mohand Melbouci, High Point, NC (US); Andrew Hughes, Greensboro, NC (US); Terry Singleton, Greensboro, NC (US); Glenn Hall, High Point, NC (US); Samuel John Thompson, Greensboro, NC (US)

(73) Assignee: KAO SPECIALTIES AMERICAS LLC, High Point, NC (US)

( * ) Notice: Subject to any disclaimer, the term of this patent is extended or adjusted under 35 U.S.C. 154(b) by 0 days.

(21) Appl. No.: 17/289,087

(22) PCT Filed: Mar. 18, 2020

(86) PCT No.: PCT/US2020/023302
§ 371 (c)(1),
(2) Date: Apr. 27, 2021

(87) PCT Pub. No.: WO2020/191018
PCT Pub. Date: Sep. 24, 2020

(65) Prior Publication Data
US 2022/0002610 A1 Jan. 6, 2022

Related U.S. Application Data

(60) Provisional application No. 62/821,035, filed on Mar. 20, 2019.

(51) Int. Cl.
*E21B 43/25* (2006.01)
*C09K 8/34* (2006.01)
(Continued)

(52) U.S. Cl.
CPC ............... *C09K 8/34* (2013.01); *C09K 8/467* (2013.01); *C09K 8/584* (2013.01); *C09K 8/588* (2013.01);
(Continued)

(58) Field of Classification Search
CPC ........... C09K 8/34; C09K 8/467; E21B 43/25
(Continued)

(56) References Cited

U.S. PATENT DOCUMENTS 3,658,734 A 4/1972 Pettitt
4,374,216 A 2/1983 Dammann
(Continued)

FOREIGN PATENT DOCUMENTS

CA         2450329        5/2012
CA      3 035 441 A1      3/2018
(Continued)

OTHER PUBLICATIONS

International Search Report and Written Opinion dated Jun. 11, 2020 in PCT/US2020/023302 filed on Mar. 18, 2020.
(Continued)

*Primary Examiner* — Zakiya W Bates
*Assistant Examiner* — Ashish K Varma
(74) *Attorney, Agent, or Firm* — Oblon, McClelland, Maier & Neustadt, L.L.P.

(57) ABSTRACT

A slurry composition that includes (A) a solvent, (B) a suspension aid, (D) an alkoxylated fatty amine, (E) an active ingredient, and optionally (C) a polar activator. The slurry composition may be formulated with up to 75 wt. % of the active ingredient (E), based on a total weight of the slurry composition, and remain as a pumpable and stable suspension. A concentrated slurry base is also disclosed which includes the solvent (A), the suspension aid (B), the polar activator (C), and the alkoxylated fatty amine (D), all being present at a higher concentration in the concentrated slurry base than a slurry composition made therefrom. A method of treating a subterranean formation is also disclosed, whereby the slurry composition is mixed with an aqueous fluid to
(Continued)

form a treatment fluid, and the treatment fluid is introduced through a wellbore penetrating the subterranean formation.

18 Claims, 1 Drawing Sheet

(51) Int. Cl.
    *C09K 8/467*     (2006.01)
    *C09K 8/584*     (2006.01)
    *C09K 8/588*     (2006.01)
    *C09K 8/60*     (2006.01)
    *C09K 8/82*     (2006.01)

(52) U.S. Cl.
    CPC ............... *C09K 8/602* (2013.01); *C09K 8/82* (2013.01); *E21B 43/25* (2013.01)

(58) Field of Classification Search
    USPC ...................................................... 166/305.1
    See application file for complete search history.

(56) References Cited

U.S. PATENT DOCUMENTS

| | | | |
|---|---|---|---|
| 4,425,271 A | | 1/1984 | Gutman |
| 4,536,325 A | * | 8/1985 | Borggrefe .............. C09K 23/00 516/69 |
| 4,566,977 A | * | 1/1986 | Hatfield ................... C09K 8/64 536/87 |
| 5,001,231 A | | 3/1991 | Zapico |
| 5,104,556 A | * | 4/1992 | Al-Yazdi ................ C09K 8/524 507/264 |
| 5,151,131 A | | 9/1992 | Burkhalter et al. |
| 5,407,477 A | * | 4/1995 | Reynolds ................. C08K 9/04 501/148 |
| 6,620,769 B1 | * | 9/2003 | Juppe ...................... C04B 24/36 507/213 |
| 7,857,055 B2 | | 12/2010 | Li |
| 8,043,999 B2 | | 10/2011 | Sullivan et al. |
| 8,044,000 B2 | | 10/2011 | Sullivan et al. |
| 2020/0071602 A1 | * | 3/2020 | Dhawan ................. C04B 24/123 |

FOREIGN PATENT DOCUMENTS

| | | |
|---|---|---|
| EP | 0 430 602 B1 | 9/1995 |
| WO | WO 2016/201445 A1 | 12/2016 |
| WO | WO 2018/045282 A8 | 3/2018 |

OTHER PUBLICATIONS

Office Action dated Jun. 6, 2023, in the corresponding Canadian Application No. 3,132,997.

* cited by examiner

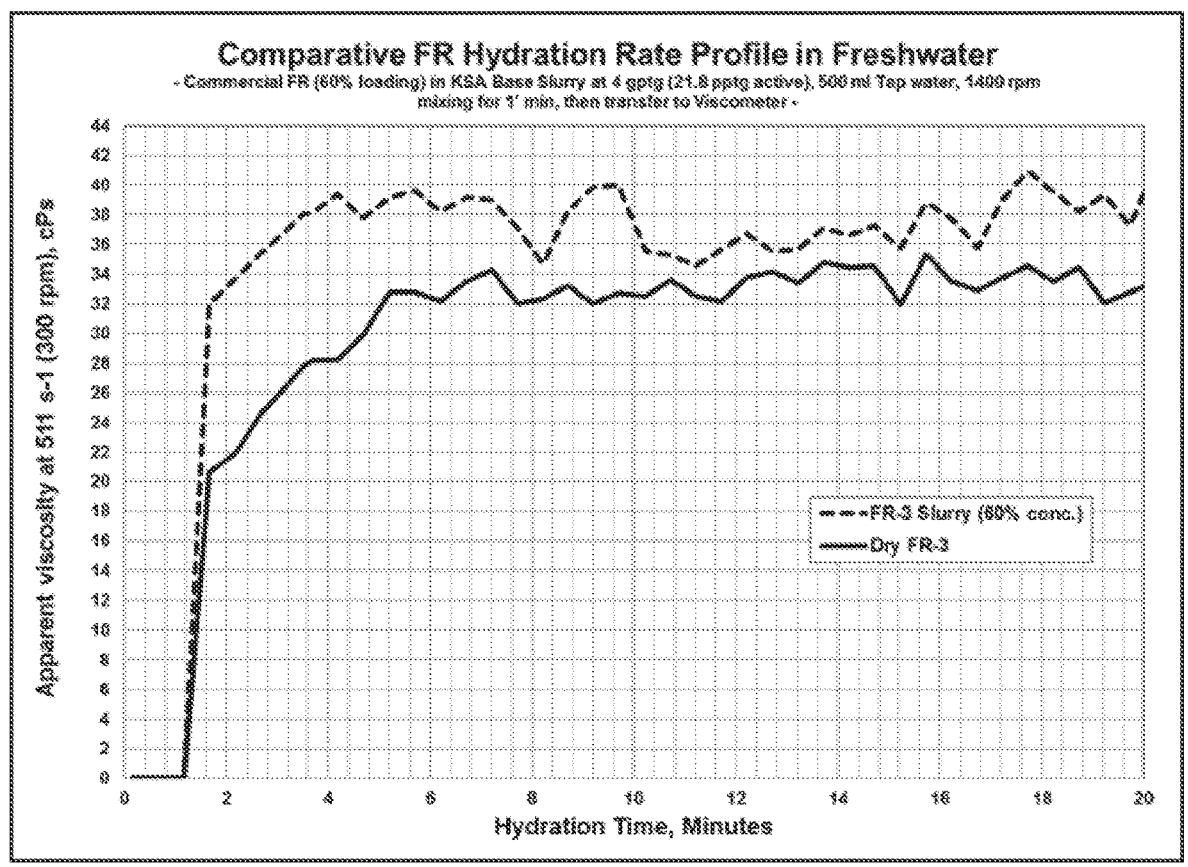

STABLE HIGH SOLIDS SLURRY COMPOSITIONS

CROSS REFERENCE TO RELATED APPLICATIONS

This application claims the benefit of U.S. Provisional Application No. 62/821,035 filed Mar. 20, 2019, which is incorporated herein by reference in its entirety.

BACKGROUND OF THE INVENTION

Field of the Invention

The present invention relates to slurry compositions, specifically slurry compositions which are stable at high solids loadings.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Water soluble polymers and inorganic materials are used in a variety of applications, such as for oil/gas extraction and related processes, water treatment, paper coating, pulp and paper, coatings, construction applications, among many others. They are generally supplied as dry powders, pumpable emulsions and/or pumpable solutions. Depending upon the application, these materials can either be used individually, or in a formulation to serve multiple purposes. When used in a formulation, the water soluble polymers or inorganic materials are formulated with compatible additives.

Water soluble polymers are commonly used in oilfield applications, for example in hydraulic fracturing (fracking). Here, water soluble polymers are used to either thicken the fracking fluids, such as gelled fluid systems or acids, or to provide friction reduction to optimize the pumping capacity of so-called "slickwater" fluids. In either case, these polymers are used to enhance the oil and/or gas extraction process and optimize the oil well productivity.

Friction reducing polymers significantly reduce the friction of the slickwater fluid during the pumping and proppant placement operations. These polymers are typically polyacrylamide polymers and copolymers thereof, and are supplied either as dry powders, or in emulsion or suspension forms. While the use of dry friction reducers in the field might require special handling equipment such as a polymer hydration unit, most of the polymers in fracking operations are supplied as either emulsions or suspensions of dry friction reducers that can be pumped directly to the well with automated systems.

Polyacrylamide emulsions are usually delivered with an active content of polymers ranging from 15 to 35 wt. %. On the other hand, dry friction reducer suspensions can be delivered with an average active content as high as 45 wt. %. While either technology can provide friction reduction performance, they each have drawbacks related to their physical stability. For instance, polyacrylamide emulsions have a tendency to settle over time, and are very sensitive to weather variations. When exposed to high temperatures, such as in the summer in the American South, these emulsions have a tendency to thicken and gel over time due to the condensation of water in the packaging headspace, which disrupts the inverse emulsion. Polyacrylamide emulsions also have a tendency to phase separate (i.e., solids settling and/or oil phase separation ("split")) over time making the product unusably heterogeneous. In the winter, these emulsions have poor freeze/thaw stability. When frozen, the emulsions are often totally unrecoverable because the thawing process makes the emulsions hydrated, and therefore not pumpable.

SUMMARY OF THE INVENTION

In view of the forgoing, there is a need for slurry compositions which can be formulated with active ingredients in amounts above 45% by weight, while still being pumpable and stable over time, even when subjected to harsh conditions such as elevated temperature and freeze/thaw conditions.

Accordingly, it is one object of the present invention to provide novel slurry compositions that meet these criteria.

It is another object of the present disclosure to provide novel concentrated slurry bases that can be used to make the slurry compositions, for example, on-site.

It is another object of the present disclosure to provide novel methods of treating a subterranean formation with treatment fluids made with the slurry compositions.

These and other objects, which will become apparent during the following detailed description, have been achieved by the inventors' unexpected discovery that alkoxylated fatty amines enable slurry compositions to be formulated with an uncharacteristically high content of deliverable solids (i.e., active ingredient), while remaining pumpable and stable for extended periods.

Thus, the present invention provides:

(1) A slurry composition, comprising:
  (A) a solvent;
  (B) a suspension aid;
  (D) an alkoxylated fatty amine; and
  (E) an active ingredient.
(2) The slurry composition of (1), wherein the solvent (A) is a hydrocarbon solvent.
(3) The slurry composition of (1) or (2), wherein the solvent (A) is present in an amount of 10 to 70 wt. %, based on a total weight of the slurry composition.
(4) The slurry composition of any one of (1) to (3), wherein the suspension aid (B) is an organophilic clay.
(5) The slurry composition of (4), wherein the organophilic clay is a smectite-type clay modified with a quaternary ammonium cation.
(6) The slurry composition of any one of (1) to (5), wherein the suspension aid (B) is present in an amount of 0.1 to 15 wt. %, based on a total weight of the slurry composition.
(7) The slurry composition of any one of (1) to (6), further comprising at least one polar activator (C) selected from the group consisting of water, an alkylene carbonate, and a $C_1$ to $C_8$ monoalcohol.
(8) The slurry composition of (7), wherein the polar activator (C) is present in an amount of 0.02 to 10 wt. %, based on a total weight of the slurry composition.
(9) The slurry composition of any one of (1) to (8), wherein the alkoxylated fatty amine (D) is an ethoxylated fatty amine.
(10) The slurry composition of any one of (1) to (9), wherein the alkoxylated fatty amine (D) is an ethoxylated fatty monoamine or an ethoxylated fatty diamine.

(11) The slurry composition of any one of (1) to (10), wherein the alkoxylated fatty amine (D) is present in an amount of 0.1 to 10 wt. %, based on a total weight of the slurry composition.

(12) The slurry composition of any one of (1) to (11), wherein the active ingredient (E) is at least one organic polymer (E1) selected from the group consisting of a polyacrylamide, a guar gum, a hydroxyethyl cellulose, a methyl hydroxyethyl cellulose, a carboxymethyl cellulose, and a xanthan gum, or at least inorganic material (E2) selected from the group consisting of calcium carbonate, tricalcium phosphate, dicalcium phosphate, titanium oxide, calcium oxide, calcium hydroxide, sodium carbonate, sodium bicarbonate, and ulexite.

(13) The slurry composition of any one of (1) to (12), wherein the active ingredient (E) is present in an amount of up to 75 wt. %, based on a total weight of the slurry composition.

(14) The slurry composition of any one of (1) to (13), wherein the active ingredient (E) is present in an amount of 46 to 60 wt. %, based on a total weight of the slurry composition.

(15) The slurry composition of any one of (1) to (14), which is in the form of a suspension having an initial viscosity of less than 5,000 cP, and when aged at a temperature of up to 40° C. for at least 4 weeks, (i) remains in suspended form with less than 5 wt. % phase separation, and (ii) maintains a viscosity of less than 5,000 cP.

(16) A concentrated slurry base, comprising:
(A) a solvent;
(B) a suspension aid;
(C) a polar activator; and
(D) an alkoxylated fatty amine.

(17) The concentrated slurry base of (16), wherein
the solvent (A) is present in an amount of 50 to 85 wt. %,
the suspension aid (B) is present in an amount of 1 to 20 wt. %,
the polar activator (C) is present in an amount of 0.1 to 15 wt. %, and
the alkoxylated fatty amine (D) is present in an amount of 1 to 30 wt. %,
each based on a total weight of the concentrated slurry base.

(18) The concentrated slurry base of (16) or (17), wherein the alkoxylated fatty amine (D) is an ethoxylated fatty monoamine or an ethoxylated fatty diamine.

(19) A method of treating a subterranean formation, comprising:
mixing an aqueous fluid with the slurry composition of any one of (1) to (15) to form a treatment fluid, and
introducing the treatment fluid through a wellbore penetrating the subterranean formation.

(20) The method of (19), wherein the treatment fluid is a drilling fluid, a cementing fluid, a completion fluid, a workover fluid, or a stimulation fluid.

BRIEF DESCRIPTION OF THE DRAWINGS

The foregoing paragraphs have been provided by way of general introduction, and are not intended to limit the scope of the following claims. The described embodiments, together with further advantages, will be best understood by reference to the following detailed description when considered in conjunction with the accompanying drawing, wherein:

The FIG. shows the comparative hydration speed of Example 12, which is a high solids slurry composition formulated with friction reducer FR-3, versus the dry FR-3 alone, using the same active content.

DETAILED DESCRIPTION OF THE INVENTION

In the following description, it is understood that other embodiments may be utilized and structural and operational changes may be made without departure from the scope of the present embodiments disclosed herein.

Definitions

The terms "comprise(s)", "include(s)", "having", "has", "contain(s)", and variants thereof, as used herein, are intended to be open-ended transitional phrases, terms, or words that do not preclude the possibility of additional acts or structures. The present disclosure also contemplates other embodiments "comprising", "consisting of" and "consisting essentially of", the embodiments or elements presented herein, whether explicitly set forth or not.

Where a numerical limit or range is stated herein, the endpoints are included. Also, all values and subranges within a numerical limit or range are specifically included as if explicitly written out.

As used herein the words "a" and "an" and the like carry the meaning of "one or more."

The phrase "substantially free", unless otherwise specified, describes an amount of a particular component being less than 1 wt. %, preferably less than 0.5 wt. %, more preferably less than 0.1 wt. %, even more preferably less than 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a linear, branched, or cyclic, saturated aliphatic fragment having 1 to 26 carbon atoms, preferably 2 to 22 carbon atoms, preferably 3 to 20 carbon atoms. Examples of alkyl groups include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl). Cycloalkyl is a type of cyclized alkyl group. Exemplary cycloalkyl groups include, but are not limited to, cyclopropyl, cyclobutyl, cyclopentyl, cyclohexyl, norbornyl, and adamantyl. The term "lower alkyl" is used herein to designate a relatively small alkyl group having 1 to 5 carbon atoms.

As used herein, the term "alkenyl", unless otherwise specified, refers to a linear, branched, or cyclic, aliphatic fragment having 2 to 26 carbon atoms, preferably 3 to 22 carbon atoms, preferably 4 to 18 carbon atoms, and which contains at least one site of unsaturation. Examples of alkenyl groups include, but are not limited to, vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, oleyl, linoleyl, and the like, including cycloalkenyl groups such as cyclopentenyl, cyclohexenyl, cycloheptenyl, and the like.

As used herein, the term "aryl" refers to an aromatic group containing only carbon in the aromatic ring(s), such as phenyl, biphenyl, naphthyl, anthracenyl, and the like.

The term "arylalkyl", as used herein, refers to a straight or branched chain alkyl moiety (as defined above) that is substituted by an aryl group (as defined above), examples of which include, but are not limited to, benzyl, phenethyl, 2-methylbenzyl, 2-(4-ethylphenyl)ethyl, and the like.

As used herein, the term "fatty" describes a compound with a long-chain hydrophobic portion made up of hydrogen and anywhere from 8 to 26 carbon atoms, which may be fully saturated or partially unsaturated, and optionally attached to a polar functional group such as a hydroxyl group, an amine group, or a carboxyl group (e.g., carboxylic acid).

The term "(meth)acrylate" is used herein to refer to both acrylate and methacrylate groups. In other words, this term should be read as through "meth" is optional. Further, "(meth)acrylate" is used generally to refer to acrylic acid, acrylate salts (e.g., sodium acrylate), and acrylic ester-based compounds.

"Drilling fluid" is a circulated fluid system that is used to aid the drilling of boreholes, for example, to provide hydrostatic pressure to prevent formation fluids from entering into the wellbore, to keep the drill bit cool and clean during drilling, to carry out drill cuttings, and/or to suspend the drill cuttings while drilling is paused and when the drilling assembly is brought in and out of the hole.

"Completion fluid" is a circulated fluid system that is used to complete/clean an oil or gas well, i.e., to facilitate final operations prior to initiation of production, such as setting screens production liners, packers, downhole valves or shooting perforations into the producing zone. Completion fluids are typically meant to control a well should downhole hardware fail, without damaging the producing formation or completion components.

"Workover fluid" is a circulated fluid system that is used during workover operations, i.e., to repair or stimulate an existing production well for the purpose of restoring, prolonging, and/or enhancing the production of hydrocarbons therefrom.

A "stimulation fluid" is a fluid used for stimulating oil/gas production, examples of which include, but are not limited to, fracking fluids and acidizing fluids. "Fracking fluid" (or frac fluid) is an injectable fluid used in fracking operations (high pressure) to increase the quantity of hydrocarbons that can be extracted. Fracking fluids contain primarily water, and may contain proppants (e.g., sand) and other desirable chemicals for modifying well production and fluid properties. "Slickwater" is a particular type of hydro-fracking fluid whereby chemical additives (i.e., friction reducers) are added along with a proppant to lower the friction of the fluid so that it can be pumped down the wellbore at higher speeds to fracture the formation.

"Cementing fluid" is a fluid used to fill the annulus after a casing string has been run, to seal a lost circulation zone, to set a plug in an existing well from which to push off with directional tools, or to plug a well so that it may be abandoned.

A "slurry" is a mixture of solids suspended in one or more liquids, and is used as a means for transporting and applying solids. "Slurry" and "suspension" are used interchangeably herein.

I. Slurry Composition

According to a first aspect, the present disclosure is directed to slurry compositions which can be formulated with a high concentration of active ingredient (e.g., organic polymer), the slurry compositions being both pumpable (have an initial viscosity below 5,000 cPs) and stable (e.g., resist gelation, solid settling, and splitting) for prolonged periods of 4 weeks or more, even when subject to elevated temperatures or freeze/thaw conditions. The slurry compositions may be formulated for various industrial applications including oilfield servicing applications, paper coating applications, water treatment applications, pulp and paper applications, construction applications, coating applications, and the like.

The slurry compositions of the present disclosure generally include the following components: (A) a solvent, (B) a suspension aid, (D) an alkoxylated fatty amine, and (E) an active ingredient, which may be either (E1) an organic polymer or (E2) an inorganic material, depending on the application of interest, and may be optionally formulated with (C) a polar activator.

(A) Solvent

The solvent (A) forms the fluid base of the slurry composition for suspending/dispersing the solid components contained therein. The amount of solvent (A) utilized may vary depending on the solids content of a particular slurry composition, but typically the solvent (A) is present in an amount of at least 10 wt. %, preferably at least 15 wt. %, preferably at least 20 wt. %, preferably at least 25 wt. %, more preferably at least 30 wt. %, even more preferably at least 35 wt. %, yet even more preferably at least 40 wt. %, and up to 70 wt. %, preferably up to 65 wt. %, preferably up to 60 wt. %, more preferably up to 55 wt. %, even more preferably up to 50 wt. %, yet even more preferably up to 45 wt. %, based on a total weight of the slurry composition.

The solvent (A) for forming the slurry composition can generally be any fluid that will suspend/disperse the solid components (e.g., the suspension aid (B), the active ingredient (E)) to form a suspension in which the active ingredient (E) is not soluble and where the slurry composition has a relatively high concentration of solids, but a viscosity low enough to be pumpable under normal operating conditions, for example under oilfield service conditions. It is preferred that the solvent (A) be selected so as not to hydrate/swell the active ingredient (e.g., the organic polymer (E1)) being suspended in the slurry composition.

While any known solvent (A) used in various oil and gas field environments is contemplated for use herein, the solvent (A) is preferably an oil-based solvent. Preference is given to oil-based solvents having a low pour point, for example, a pour point of less than $-10°$ C., preferably less than $-15°$ C., preferably less than $-20°$ C., preferably less than $-25°$ C., preferably less than $-30°$ C., preferably less than $-35°$ C., more preferably less than $-40°$ C., even more preferably less than $-45°$ C., yet even more preferably less than $-50°$ C. Suitable examples of oil-based solvents may include, but are not limited to, a hydrocarbon solvent, an animal or vegetable oil, and/or a biodiesel.

In preferred embodiments, the solvent (A) is a hydrocarbon solvent, which may be, for example, a petroleum distillate or a refined petroleum distillate, a synthetic hydrocarbon blend, a polyolefin, a terpene, etc. Blends of hydrocarbon solvents may also be used. Exemplary hydrocarbon solvents may include, but are not limited to, hexanes (hexane, isohexane, cyclohexane), heptane, dearomatized hydrocarbon solvents such as EXXSOL solvents (available from ExxonMobil), low-aromatic base oil, mineral oil, white mineral oil, mineral seal oil, mineral spirits such as rule 66 mineral spirits, VM&P naphtha, kerosene, hydrotreated kerosene, diesel oil, middle distillate fuels, isoparaffinic and naphthenic aliphatic hydrocarbon solvents such as those obtained from hydrotreating/refining light petroleum distillates, dimers and higher oligomers of ethylene and/or propylene including blends of linear paraffins and unsaturated products formed from such oligomerization chemistry, and D-limonene, with specific mention being made to mineral oil, diesel oil, kerosene, hydrotreated/refined light petroleum distillates, and synthetic hydrocarbon blends. As such, the hydrocarbon solvent used herein may contain predominantly hydrocarbons such as paraffins, isoparaffins, napthenes (cycloparafins), and alkenes (e.g., olefins, alpha olefins, poly-alphaolefins). It should be understood that the hydrocarbon solvent is not limited to only hydrocarbon components, and may optionally contain non-hydrocarbon components such as oxygenates, with specific mention being made to, methanol, ethanol, isopropyl alcohol, butanol, gasoline grade tert-butanol, methyl tert-butyl ether, tert-amyl methyl ether, tert-hexyl methyl ether, ethyl tert-butyl ether, tert-amyl ethyl ether, and diisopropyl ether.

The hydrocarbon solvent may be composed primarily of paraffins, isoparaffins, and/or napthenes, preferably hydrotreated isoparaffinic and napthenic blends. In some embodiments, the hydrocarbon solvent is a synthetic hydrocarbon blend, such as a synthetic blend of paraffins, olefins, and oxygenates, or a synthetic blend derived from natural gas through a gas-to-liquids (GTL) process.

Particularly useful hydrocarbon solvents are those that have a boiling range of (initial) from 200° C., preferably from 210° C., preferably from 220° C., more preferably from 230° C., even more preferably from 240° C., yet even more preferably from 250° C., and up to (final) 350° C., preferably up to 340° C., preferably up to 330° C., preferably up to 320° C., preferably up to 310° C., more preferably up to 300° C., even more preferably up to 290° C., yet even more preferably up to 280° C., for example, those hydrocarbon solvents based on $C_{12}$ to $C_{20}$, preferably $C_{14}$ to $C_{18}$, more preferably $C_{15}$ to $C_{16}$ paraffinic and/or naphthenic hydrocarbons. In some embodiments, the hydrocarbon solvent has a kinematic viscosity of at least 1.0 cSt, preferably at least 1.4 cSt, preferably at least 1.8 cSt, preferably at least 2.0 cSt, more preferably at least 2.2 cSt, even more preferably at least 2.4 cSt, yet even more preferably at least 2.6 cSt, and up to 4.0 cSt, preferably up to 3.6 cSt, more preferably up to 3.5 cSt, even more preferably up to 3.2 cSt, yet even more preferably up to 3.0 cSt.

Also preferred for environmental reasons are those hydrocarbon solvents which are substantially free of aromatic hydrocarbons (e.g., benzene, toluene, ethylbenzene and/or xylene (BTEX), and polycyclic aromatic hydrocarbons), preferably those which contain less than 5,000 ppm, preferably less than 1,000 ppm, preferably less than 100 ppm, preferably less than 50 ppm, preferably less than 10 ppm, preferably less than 1 ppm, preferably less than 500 ppb, more preferably less than 250 ppb, even more preferably less than 100 ppb, yet even more preferably less than 25 ppm of aromatic hydrocarbons, as determined for example by GC/MS according to US EPA SW-846 Test Method 8260B.

Specific examples of the hydrocarbon solvent may include, but are not limited to, EFC CRYSTAL 250 (an ultra-purified mineral oil in the $C_{15}$-$C_{20}$ range having an ultralow BTEX content, available from Total), LPA-210 (a refined (hydrotreated) petroleum distillate, of isoparafins and naphthenics with a very low polycyclic aromatics and BTEX content, available from Sasol), CONOSOL C-200 and CONOSOL C-260 (aliphatic solvents composed primarily of $C_{12}$-$C_{16}$ naphthenic and isoparaffinic hydrocarbons, available from Calumet Lubricants), HF 1000 (a BTEX free synthetic blend of paraffins, olefins, and oxygenates, available from Sasol), and BIO-BASE 628 (a synthetic blend with a low aromatic content, available from Shrieve).

In some embodiments, the solvent (A) is an animal or vegetable oil, with specific mention being made to linseed oil, palm oil, rapeseed oil, cottonseed oil, soybean oil, olive oil, canola oil, sunflower oil, peanut oil, palm kernel oil, grape seed oil, safflower oil, corn oil, fish oil, castor oil, their derivatives, as well as mixtures thereof.

In some embodiments, the solvent (A) is a biodiesel, which is any of the mono alkyl esters of long chain fatty acids derived from animal or vegetable oils, such as those described above. The biodiesel may be a pure biodiesel material known as "B100" biodiesel. Alternatively, the biodiesel may be a mixture of biodiesel with conventional petroleum diesel fuels are known as "Bxyz" biodiesel, where xyz is the percent biodiesel in the fuel. The biodiesel may be made by reacting the animal or vegetable oils with an alcohol such as methanol, but other alcohols may also be used.

(B) Suspension Aid

The slurry composition is also formulated with one or more suspension aids (B), which may be used to provide viscosity and often thixotropic properties to the slurry composition so that the suspended solids are prevented from settling. The suspension aid (B) may be present in the slurry composition in an amount of at least 0.1 wt. %, preferably at least 0.3 wt. %, preferably at least 0.5 wt. %, preferably at least 0.7 wt. %, preferably at least 0.9 wt. %, preferably at least 1.1 wt. %, more preferably at least 1.3 wt. %, even more preferably at least 1.5 wt. %, yet even more preferably at least 1.7 wt. %, and up to 15 wt. %, preferably up to 13 wt. %, preferably up to 11 wt. %, preferably up to 9 wt. %, preferably up to 7 wt. %, preferably up to 5 wt. %, preferably up to 4 wt. %, preferably up to 3.5 wt. %, more preferably up to 3 wt. %, even more preferably up to 2.5 wt. %, yet even more preferably up to 2 wt. %, based on a total weight of the slurry composition.

Any suspension aid (B) which helps to prevent solid settling may be utilized herein, examples of which include, but are not limited to, an organophilic clay; a latex (e.g., a styrene-butadiene latex); an organic polymeric thickener, for example, alkali swellable polymers (e.g., homopolymers and copolymers of ethylenically unsaturated carboxylic acid monomers such as acrylic acid, methacrylic acid, and/or maleic acid), hydrogen bridging rheology modifiers (e.g., hydrocolloids such as cellulose and hydrophilic cellulose derivatives), and hydrophobic associative thickeners such as hydrophobically modified natural or synthetic polymers that contain both hydrophobic and hydrophilic substituent groups, for example hydrophobically modified cellulose derivatives and polymers having a synthetic hydrophilic polymer backbone such as a poly(oxyalkylene) backbone (e.g., poly(oxyethylene) or poly(oxypropylene) backbone) and hydrophobic pendant groups (e.g., $C_{10}$-$C_{30}$ hydrocarbon groups); silica (e.g., fumed silica), or a combination thereof. In case there is any overlap between the suspension aid (B) and the active ingredient (E), the weight percent of the component in the slurry composition will dictate whether that component is to be considered a suspension aid (B) or an active ingredient (E). Further, in any given slurry composition, the suspension aid (B) is different from the active ingredient (E) and are not to be considered the same component.

In preferred embodiments, the suspension aid (B) is an organophilic clay, preferably a modified phyllosilicate (sheet silicate), more preferably a clay mineral modified with an organic cation (e.g., a quaternary ammonium cation). For example, the organophilic clay may be a sheet silicate/clay mineral ion-exchanged with an organic cation. Suitable sheet silicates/clay minerals to be modified may include, but are not limited to, a kaolin, a smectite (e.g., bentonite, montmorillonite, hectorite, laponite, biedellite, saponite, stevensite), an illite, a pyrophyllite, an attapulgite/palygorskite, a sepiolite, or a mixture thereof. Preferably, the sheet silicates/clay mineral to be modified is a smectite-type clay, preferably a bentonite- or montmorillonite-type clay.

Preferred organophilic clays are those sheet silicates/clay minerals (e.g., smectite-type clays) which have been ion exchanged with one or more quaternary ammonium cations, for example a quaternary ammonium cation containing four alkyl, alkenyl, and/or an arylalkyl groups. The alkyl, alkenyl, and/or arylalkyl groups may be the same or different, and may be straight-, branched-, and/or cyclic, saturated and/or unsaturated, including those made of 1 to 26 carbon atoms, preferably 2 to 22 carbon atoms, more preferably 3 to 20 carbon atoms, even more preferably 4 to 18 carbon atoms. Preferred quaternary ammonium cations are those which contain at least one, preferably at least two, preferably at least three fatty groups per molecule, preferably one or two fatty groups per molecule with the remaining groups being a lower alkyl group (e.g., $C_1$ to $C_3$) and/or a benzyl group, with specific mention being made to quaternary ammonium cations made from saturated fatty groups, in particular saturated fatty groups having from 12 to 18 carbon atoms. As examples, the quaternary ammonium cations may include, but are not limited to, methyl trihydrogenatedtallow ammonium, dimethyl dihydrogenatedtallow ammonium, dimethyl dihydrogenated-palm oil ammonium, dimethyl dilauryl ammonium, benzalkonium cations (e.g., dimethyl benzyl hydrogenatedtallow ammonium, dimethylbenzyloctadecyl ammonium), methyl benzyl dihydrogenatedtallow ammonium, methyl benzyl dehydrogenated-palm oil ammonium, methyl benzyl distearalkyl ammonium, and methyl benzyl dilauryl ammonium.

In some embodiments, the organophilic clay has a (loose) bulk density of at least 300 kg/m³, preferably at least 320 kg/m³, more preferably at least 340 kg/m³, even more preferably at least 360 kg/m³, yet even more preferably at least 370 kg/m³, and up to 520 kg/m³, preferably up to 500 kg/m³, preferably up to 480 kg/m³, preferably up to 460 kg/m³, more preferably up to 440 kg/m³, even more preferably up to 420 kg/m³, yet even more preferably up to 400 kg/m³. In some embodiments, the organophilic clay has an average particle size of at least 1 μm, preferably at least 2 μm, preferably at least 3 μm, preferably at least 4 μm, preferably at least 5 μm, more preferably at least 10 μm, even more preferably at least 15 μm, yet even more preferably at least 20 μm, and up to 75 μm, preferably up to 65 μm, preferably up to 55 μm, more preferably up to 45 μm, even more preferably up to 35 μm, yet even more preferably up to 25 μm.

Specific examples of organophilic clays that may be used as suspension aids (B) herein include, but are not limited to, BARAGEL 3000, BENTONE 155, BENTONE SD series, BENTONE 900 series and BENTONE 34, (each are organically modified bentonite clays, available from Elementis), BENTONE 990 (an organically modified attapulgite clay, available from Elementis), TIXOGEL VP and TIXOGEL MP 100 (each are organically modified montmorillonites, available from BYK) TIXOGEL TE (an organically modified hectorite, available from BYK), and CLAYTONE 40, CLAYTONE II, CLAYTONE SF and CLAYTONE AF (each organophilic bentonites, available from BYK).

Apart from sheet silicate/clay minerals (e.g., bentonites, montmorillonites, hectorites and attapulgites) ion-exchanged with quaternary ammonium cations containing four alkyl, alkenyl, and/or an arylalkyl groups, it is also possible to use as the suspension aid (B) sheet silicate/clay minerals ion-exchanged with quaternized alkanolamine fatty acid esters, in particular sheet silicate/clay minerals (e.g., bentonite) ion-exchanged with dimethyldiethanolammonium mono fatty acid and difatty acid esters, or with methyltriethanolammonium monofatty acid, difatty acid and trifatty acid esters. Preference is given to corresponding esters with saturated fatty acids, in particular saturated fatty acids having from 12 to 18 carbon atoms.

(C) Polar Activator

The slurry composition may also optionally include one or more polar activators (C). When present, the polar activator(s) may be used in an amount of at least 0.02 wt. %, preferably at least 0.06 wt. %, preferably at least 0.1 wt. %, preferably at least 0.14 wt. %, preferably at least 0.18 wt. %, preferably at least 0.22 wt. %, more preferably at least 0.26 wt. %, even more preferably at least 0.28 wt. %, yet even more preferably at least 0.3 wt. %, and up to 10 wt. %, preferably up to 6 wt. %, preferably up to 4 wt. %, preferably up to 2 wt. %, preferably up to 1 wt. %, preferably up to 0.8 wt. %, more preferably up to 0.7 wt. %, even more preferably up to 0.6 wt. %, yet even more preferably up to 0.5 wt. %, based on a total weight of the slurry composition.

Polar activators (C) of the present disclosure are generally low molecular weight polar components added in the above quantities in order to aid dispersion and gelling of the suspension aid (B), thereby increasing the viscosity of, and in some cases the extent of crosslinking in, the slurry composition. In general, polar activators (C) which may be used herein include, but are not limited to:

water;

an alkylene carbonate, which is typically made from reaction of an alkylene oxide (e.g., ethylene oxide, propylene oxide, butylene carbonate, including mixtures thereof) with carbon dioxide, with specific mention being made to JEFFSOL ethylene carbonate (EC), JEFFSOL propylene carbonate (PC), and JEFFSOL butylene carbonate (BC), including blends thereof such as JEFFSOL EC-75 (a 75/25 EC/PC blend), JEFFSOL EC-50 (a 50/50 EC/PC blend), and JEFFSOL EC-25 (a 25/75 EC/PC blend);

lower monoalcohols containing from 1 to 8 carbon atoms, preferably 2 to 6 carbon atoms, preferably 3 to 4 carbon atoms, such as methanol, ethanol, 1-propanol, 1-butanol, 2-butanol, 2-propanol, benzyl alcohol, furfuryl alcohol, with the most preferred being methanol and ethanol;

ethers (non-glycol ethers), for example ethers containing 4 to 8 carbon atoms such as diethyl ether, dipropyl ether, methyl tert-butyl ether, dibutyl ether, dioxane, and tetrahydrofuran;

ketones, for example ketones containing 3 to 6 carbon atoms, including acetone, methyl ethyl ketone, 3-pentanone, methyl isoamyl ketone, cyclohexanone, and diacetone alcohol;

esters, including those having 3 to 8 carbon atoms, for example methyl acetate, ethyl acetate, n-butyl acetate, methyl lactate, ethyl lactate, butyl lactate, methoxyethyl acetate, ethoxyethyl acetate, methoxypropyl acetate, ethoxypropyl acetate, 3-ethoxy ethyl propionate, N-amyl acetate, γ-butyrolactone, dibasic ester mixtures (DBE) (e.g., dimethylglutarate, dimethyl succinate and dimethyl adipate);

dipolar aprotic solvents such as dimethylformamide, (DMF), N-methyl-2-pyrrolidone (NMP), and dimethyl sulfoxide (DMSO);

and the like, as well as mixtures of two or more thereof.

Preferred polar activators (C) of the present disclosure are water, an alkylene carbonate, and/or a $C_1$ to $C_8$ monoalcohol, preferably water, propylene carbonate, and/or a $C_1$ to $C_3$ monoalcohol, more preferably water, propylene carbonate, and/or methanol. When the slurry composition contains a mixture of polar activators (C) (for example a mixture of a first polar activator and a second polar activator) a volume ratio of the polar activators may range from 1:99, preferably from 5:95, preferably from 10:90, preferably from 20:80, more preferably from 30:70, even more preferably from 40:60, yet even more preferably from 50:50, and up to 99:1, preferably up to 95:5, preferably up to 90:10, preferably up to 80:20, more preferably up to 70:30, even more preferably up to 60:40, yet even more preferably up to 55:45.

In some embodiments, the slurry compositions contain water. For example, the slurry composition may contain a mixture of a $C_1$ to $C_8$ monoalcohol and water, preferably a mixture of methanol and water, more preferably a mixture of methanol and water in a volume ratio of 95:5. In some embodiments, the polar activator is/consists of water.

In some embodiments, the slurry compositions are substantially free of water, preferably completely free of water, for example, the polar activator (C) employed is propylene carbonate.

In some embodiments, the slurry compositions are substantially free of polar activators (C), and are instead "heat activated". Here, instead of chemically activating the suspension aid (B) with one or more polar activators (C), heat may be applied during manufacture of the slurry compositions to aid dispersion and gelling of the suspension aid (B). For example, after addition of the suspension aid (B) to form a dispersion, the dispersion may be heated to at least 35° C., preferably at least 38° C., more preferably at least 40° C., and up to 55° C., preferably up to 50° C., more preferably up to 45° C., for at least 10 minutes, preferably at least 15 minutes, preferably at least 20 minutes, preferably at least 25 minutes, preferably at least 30 minutes, preferably at least 40 minutes, preferably at least 45 minutes, preferably at least 50 minutes, more preferably at least 60 minutes, even more preferably at least 90 minutes, yet even more preferably at least 120 minutes, or until sufficient swelling of the suspension aid (B) occurs.

Alkoxylated Fatty Amine (D)

The slurry compositions of the present disclosure also include one or more alkoxylated fatty amines (D), which may be present in the slurry compositions in an amount of at least 0.1 wt. %, preferably least 0.2 wt. %, preferably least 0.3 wt. %, preferably least 0.5 wt. %, preferably least 0.6 wt. %, preferably least 0.8 wt. %, preferably least 1 wt. %, preferably least 1.2 wt. %, preferably least 1.4 wt. %, more preferably least 1.6 wt. %, even more preferably least 1.8 wt. %, yet even more preferably least 2 wt. %, and up to 20 wt. %, preferably up to 18 wt. %, preferably up to 15 wt. %, preferably up to 10 wt. %, preferably up to 8 wt. %, preferably up to 6 wt. %/o, preferably up to 4 wt. %, preferably up to 3.5 wt. preferably up to 3.1 wt. %, preferably up to 3 wt. %, more preferably up to 2.8 wt. %, even more preferably up to 2.6 wt. %, yet even more preferably up to 2.5 wt. %, based on a total weight of the slurry composition.

The alkoxylated fatty amine (D) used herein is a specific type of surfactant which acts as a stabilizer to provide high solids slurry compositions with a pumpable viscosity and stability (e.g., prevents gelation, solid settling, and splitting) for prolonged periods even under suboptimal storage conditions such as high temperature conditions or conditions of repeated freezing/thawing.

Alkoxylated fatty amines (D) are non-ionic surfactants which may be prepared through alkoxylation of a suitable fatty amine. Fatty amines are compounds having a long-chain aliphatic group (fatty portion) bound to an amine functional group. The long-chain aliphatic group may be made up of hydrogen and anywhere from at least 8, preferably at least 10, more preferably at least 12, even more preferably at least 14, yet even more preferably at least 16 carbon atoms, and up to 26, preferably up to 22, more preferably up to 20, even more preferably up to 18 carbon atoms. The fatty portion of the fatty amine may be saturated (an alkyl group) or may contain sites of unsaturation (an alkenyl group), for example, the fatty portion may be a mono-, di-, tri-, oligo-, or poly-unsaturated alkenyl group. The site(s) of unsaturation may be cis-double bonds, trans-double bonds, or a combination. Whether saturated or unsaturated, the fatty portion may be linear, branched, cyclic (or contain cyclic hydrocarbon groups such as those derived from naphthenic acids). Preferably, the fatty portion is a linear alkyl group or a linear alkenyl group having the carbon count described above.

Fatty amines may be derivable from fatty acids, for example by subjecting a fatty acid, either a synthetic fatty acid or a naturally occurring fatty acid, to the Nitrile process followed by reduction (e.g., hydrogenation), or by reacting a fatty alcohol or fatty alkyl halide (both also derivable from synthetic or natural fatty acids) with a suitable amine nucleophile, both such methods being known by those of ordinary skill in the art. Exemplary fatty acid starting materials that may be used to make the fatty amine may include, but are not limited to, caprylic acid, capric acid, lauric acid, myristic acid, palmitic acid, stearic acid, arachidic acid, behenic acid, lignoceric acid, cerotic acid, myrstoleic acid, palmitoleic acid, sapienic acid, oleic acid, elaidic acid, vaccenic acid, linoleic acid, linoelaidic acid, α-inolenic acid, arachidonic acid, eicosapentaenoic acid, erucic acid, docosahexaenoic acid, and the like, as well as fatty acid mixtures (natural or synthetic mixtures) such as tall oil fatty acid and its derivatives (TOFA), coconut oil fatty acid and its derivatives, tallow fatty acid and its derivatives (tallow), naphthenic acids and its derivatives, soya fatty acid and its derivatives (soya), palm oil fatty acid and its derivatives, palm kernel oil fatty acid and its derivatives, and the like. Derivatives of the above fatty acids may include, but are not limited to, partially hydrogenated derivatives and fully hydrogenated derivatives.

Therefore, the fatty amines may also exist as a distribution or mixture of fatty amines when derived from mixtures of (naturally occurring) fatty acids. Exemplary fatty amines derivable or manufactured from fatty acids, may include, but are not limited to, coco amine, palmitoleylamine, oleylamine, tallow amine (e.g., FARMIN T, FARMIN TD, and DIAMIN T (N-tallow alkyltrimethylenediamine)—each commercially available from Kao Corporation), tall oil fatty acid amine, laurylamine, linoleylamine, myristylamine, cetylamine, stearylamine, pentadecylamine, and soya amine, any of which may be optionally hydrogenated, partially hydrogenated, or non-hydrogenated.

The fatty amine may be i) a fatty monoamine, i.e., contain a single amine group per molecule, such as a primary fatty monoamine (R—$NH_2$), a secondary di-fatty monoamine (R—NH—R), or a fatty lower alkyl (e.g., methyl) monoamine (R—NH—$CH_3$); or ii) a fatty polyamine, i.e., contain 2, 3, 4, or more amine groups per molecule, such as a fatty diamine, a fatty triamine, a fatty tetraamine, etc. Examples of fatty polyamines include fatty ethylene diamines (R—NH—(CH$_2$)$_2$—NH$_2$), fatty ethylene triamines (linear or branched, R—NH—(CH$_2$)$_2$—NH—(CH$_2$)$_2$—NH$_2$), fatty ethylene tetramines (linear or branched, R—NH—(CH$_2$)$_2$—NH—(CH$_2$)$_2$—NH—(CH$_2$)$_2$—NH$_2$), fatty propylene diamines (R—NH—CH$_2$—CH(CH$_3$)—NH$_2$), fatty propylene triamines (linear or branched, R—NH—CH$_2$—CH(CH$_3$)—NH—CH$_2$—CH(CH$_3$)—NH$_2$), fatty propylene tetramines (linear or branched, R—NH—CH$_2$—CH(CH$_3$)—NH—CH$_2$—CH(CH$_3$)—NH—CH$_2$—CH(CH$_3$)—NH$_2$), fatty trimethylene diamines (R—NH—(CH$_2$)$_3$—NH$_2$), fatty trimethylene triamines (linear or branched, R—NH—(CH$_2$)$_3$—NH—(CH$_2$)$_3$—NH$_2$), and fatty trimethylene tetramines (linear or branched, R—NH—(CH$_2$)$_3$—NH—(CH$_2$)$_3$—NH—(CH$_2$)$_3$—NH$_2$. In each of the above generic structures, R is used to indicate the fatty aliphatic portion of the fatty amine.

Alkoxylation of any of the aforementioned fatty amines, for example, through reaction with one or more suitable alkylene oxides (e.g., ethylene oxide (EO), propylene oxide (PO), and/or butylene oxide (BO)), then provides the alkoxylated fatty amines (D) useful as a stabilizer in the disclosed slurry composition. Any primary amine groups of the fatty amine may be mono- or bis-alkoxylated (attached to one or two (poly)oxyalkylene ether groups in the alkoxylated fatty amine), and any secondary amine groups of the fatty amine may be mono-alkoxylated (attached to one (poly)oxyalkylene ether group in the alkoxylated fatty amine). Of course, it is also possible in the case of alkoxylated fatty polyamines that one or more amine groups are alkoxylated while one or more amine groups do not react with an alkylene oxide and remain non-alkoxylated. The (poly)oxyalkylene group(s) may include polyoxyethylene (—(CH$_2$—CH$_2$—O)$_m$—H), polyoxypropylene (—(CH$_2$—CH(CH$_3$)—O)$_m$—H), and/or polyoxybutylene (—(CH$_2$CH(CH$_2$CH$_3$)—O)$_m$—H) groups. The fatty amine may be alkoxylated with up to 100 molar equivalents of the alkylene oxide (the number of repeating units, m, is from 1 to 100), for example, from 1, preferably from 2, preferably from 3, preferably from 4, preferably from 5, preferably from 6, preferably from 7, more preferably from 8, even more preferably from 9, yet even more preferably from 10, and up to 100, preferably up to 75, preferably up to 50, preferably up to 40, preferably up to 30, preferably up to 25, preferably up to 20, preferably up to 18, more preferably up to 16, even more preferably up to 15, yet even more preferably up to 12 molar equivalents of alkylene oxide per mol of fatty amine. The alkoxylated fatty amine (D) is preferably an ethoxylated fatty amine. In some embodiments, the alkoxylated fatty amine (D) is an ethoxylated fatty monoamine. In some embodiments, the alkoxylated fatty amine (D) is an ethoxylated fatty diamine.

Alkoxylated fatty amines (D) having a wide range of hydrophilic-lipophilic balance (HLB) values are useful herein. For example, the alkoxylated fatty amines may have a hydrophilic-lipophilic balance (HLB) according to Griffin's method of at least 5, preferably at least 5.1, preferably at least 5.5, preferably at least 6, preferably at least 6.5, more preferably at least 7, even more preferably at least 7.5, yet even more preferably at least 8, and up to 20, preferably up to 18, preferably up to 16, preferably up to 15.4, preferably up to 15, preferably up to 14, preferably up to 13, preferably up to 12, more preferably up to 11, even more preferably up to 10, yet even more preferably up to 9.

Suitable examples of alkoxylated fatty amines (D) may include, but are not limited to, an alkoxylated coconut amine, an alkoxylated palmitoleylamine, an alkoxylated oleylamine, an alkoxylated tallow amine, an alkoxylated tall oil amine, an alkoxylated laurylamine, an alkoxylated myristylamine, an alkoxylated cetylamine, an alkoxylated stearylamine, an alkoxylated linoleyl amine, and an alkoxylated soya amine, with preference given to an ethoxylated coconut amine, an ethoxylated palmitoleylamine, an ethoxylated oleylamine, an ethoxylated tallow amine, an ethoxylated tall oil amine, an ethoxylated laurylamine, an ethoxylated myristylamine, an ethoxylated cetylamine, an ethoxylated stearylamine, an ethoxylated linoleyl amine, and an ethoxylated soya amine, including both monoamine and polyamine (e.g., ethylene diamine, diethylene triamine, triethylene tetramine, propylene diamine, dipropylene triamine, tripropylene tetraamine, trimethylene diamine, trimethylene triamine, and trimethylene tetraamine) variants thereof. In preferred embodiments, the alkoxylated fatty amine (D) employed is an alkoxylated tallow amine, preferably an ethoxylated tallow amine, more preferably an ethoxylated (2 EO-30 EO) tallow amine, even more preferably an ethoxylated (2 EO-30 EO) tallow monoamine or an ethoxylated (2 EO-30 EO) tallow trimethylenediamine.

Specific examples of alkoxylated fatty monoamines which may be used as a stabilizer herein include, but are not limited to, AMIET 102, AMIET 105, AMIET 302, AMIET 308, AMIET 320, AMIET 502, AMIET 505, and AMIET 515, each available from Kao Corporation. Specific examples of alkoxylated fatty diamines which may be used as a stabilizer herein include, but are not limited to, DIAMIET 503, DIAMIET 505, DIAMIET 510, and DIAMIET 515, each available from Kao Corporation.

As will become clear, it has been unexpectedly discovered that a specific type of stabilizer/surfactant—the alkoxylated fatty amine (D)—is capable of stably suspending the solid components (e.g., the active ingredient (E)) present in high concentrations in the slurry compositions, and furnishing high solids slurry compositions having pumpable viscosity (see e.g., the Examples presented in Tables 2A-2B, 3-6, 8-9, 10A-10C, 11-12, and 14-15). On the other hand, it has been found that other types of stabilizers/surfactants, including those common to oil and gas treatment fluids, fail to generate stable and pumpable suspensions at equivalent high solids loadings (i.e., such slurry compositions are too viscous to be pumped, gel over time, and/or phase separate) (see e.g., Comparative Examples 1-4 presented in Tables 2A and 2B). Examples of these other stabilizer/surfactants may include, but are not limited to, cationic surfactants, including but not limited to: protonated fatty amines such as protonated salts of $C_6$-$C_{22}$ alkyl monoamines, protonated salts of $C_6$-$C_{22}$ alkyl (poly)alkylene polyamines, and protonated salts of alkoxylated fatty amines; protonated fatty alkyl amidoamines such as protonated forms of stearamidopropyldimethylamine, stearamidopropyldiethylamine, and palmitamidoethyldimethylamine; and quaternary ammonium compounds such as those formed from alkylation of a tertiary fatty amine, an alkoxylated (tertiary) amine, or an aprotic nitrogenous heteroarene (optionally substituted) having at least one aromatic nitrogen atom with a reactive lone pair of electrons, with specific mention being made to a tri-fatty alkyl ammonium compounds (e.g., trioctyl methyl ammonium chloride), fatty trimethyl ammonium compounds, difatty dimethyl ammonium compounds, fatty benzyl dimethyl ammonium compounds, and N-fatty alkyl pyridinium or a quinolinium compounds;

anionic surfactants including, but not limited to: sulfates, such as alkyl sulfates, alkyl-ester-sulfates, alkyl ether sulfates, alkyl-alkoxy-ester-sulfate, sulfated alkanolamides, and glyceride sulfates; sulfonates such as alkyl sulfonates, aryl sulfonates, alkylaryl sulfonates, fatty alkyl-benzene sulfonates, lower alkyl-benzene sulfonates, alpha olefin sulfonates, and lignosulfonates; phosphates such as alkyl aryl ether phosphates, alkyl ether phosphates, and phosphates of fatty alcohols or polyoxyalkylene ethers of fatty alcohols;

non-ionic surfactants including, but not limited to: amides or monoalkanolamides of fatty acids, including alkoxylated monoalkanolamides of fatty acids such as coconut fatty acid monoethanolamide and coconut fatty acid monoethanolamide reacted with 2-20 moles of ethylene oxide; fatty esters such as alkoxylated (e.g., ethoxylated and/or propoxylated) fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters such as sorbitan fatty acid esters, for example, sorbitan monolaurate (e.g., EMASOL L-10V, available from Kao Corporation) and sorbitan monooleate (e.g., SPAN 80, available from Sigma Aldrich); ethers, such as alcohol alkoxylates (alkoxylated $C_1$-$C_{22}$ alcohols) including alkoxylated fatty alcohols (e.g., ethoxylated cetyl stearyl alcohol, ethoxylated lauryl alcohol) with specific mention being made to EMULGEN products like EMULGEN 150 and EMULGEN 4204 from Kao Corporation, alkoxylated polysiloxanes, ethylene oxide/propylene oxide copolymers, aryl alkoxylates such as alkoxylated alkylphenols (e.g., ethoxylated nonylphenols) and alkoxylated distyrenated phenyl ethers (e.g., EMULGEN A-60, available from Kao Corporation), and alkyl polyglycosides (APGs) such as those made from reaction between fatty alcohols and glucose (e.g., alkyl polyglucoside); modified polysiloxanes; alkyl modified polyoxyalkyleneamines; alkyl modified propoxylated diamines; fatty amines/fatty alkyl amines including both monoamine and polyamine variants (e.g., coco amine, stearyl amine, palmitoleylamine, oleylamine, tallow amines such as FARMIN T, FARMIN TD, and DIAMIN T (N-tallow alkyltrimethylenediamine)—each commercially available from Kao Corporation, tall oil fatty acid amine, laurylamine, linoleylamine, myristylamine, cetylamine, stearylamine, and soya amine); and alkyl ether amines (e.g., hexyloxypropyl amine, isotridecyloxypropyl amine, tetradecyl/dodecyloxypropyl amine, etc.); and amphoteric surfactants including, but not limited to: fatty alkyl betaines such as lauryl betaine (e.g., AMPHITOL 24B, available from Kao Corporation); fatty alkyl amido betaines such as fatty amidopropyl dimethylamino betaine; fatty alkyl sultaines such as fatty dimethyl hydroxysultaine; fatty alkyl amido sultaines such as fatty amido propyl dimethylamino hydroxysultaine; amine oxides, such as N-cocoamidopropyl dimethyl amine oxide, dimethyl fatty alkyl amine oxides such as dimethyl coco amine oxide, lauryldimethyl amine oxide (e.g., AMPHITOL 20N, available from Kao Corporation); and imidazole-based amphoteric surfactants (e.g., ELEC AC, available from Kao Corporation).

So while other types of stabilizers/surfactants are not necessarily excluded from use in the disclosed slurry compositions of the present disclosure, their optional use is to be accompanied by the alkoxylated fatty amine (D) for acceptable viscosity and suspension stability.

(E) Active Ingredient

A particular advantage of the slurry compositions of the present disclosure is that the slurry compositions are open to, and may be formulated with, a variety of active ingredients (E) for use in a various applications and under a variety of conditions. A person of ordinary skill in the art will be able to determine what active ingredient (E) should be delivered for a particular purpose in a particular environment. Thus, the 'active ingredient' of the present disclosure is a general term referring to a deliverable solid material that may be varied in the disclosed slurry compositions depending on a particular application. For example in the case of oil field applications, the active ingredient may be a solid needed for drilling operations, cementing operations, completion operations, workover operations, and/or stimulation operations, just to name a few, and may additionally be varied to suit certain well environments (e.g., temperature, salinity, pH tolerance, etc.).

Further, it has been found that the slurry compositions herein are accepting of high active ingredient (E) loadings (e.g., up to 75 wt. %) and still remain as pumpable and stable slurries. For example, the active ingredient (E) may be present in the slurry composition in an amount of at least 5 wt. %, preferably at least 10 wt. %, preferably at least 15 wt. %, preferably at least 20 wt. %, preferably at least 25 wt. %, preferably at least 30 wt. %, preferably at least 35 wt. %, preferably at least 40 wt. %, preferably at least 45 wt. %, preferably at least 46 wt. % preferably at least 48 wt. %, preferably at least 50 wt. %, preferably at least 52 wt. %, preferably at least 54 wt. %, preferably at least 56 wt. %, preferably at least 58 wt. %, and up to 75 wt. %, preferably up to 73 wt. %, preferably up to 70 wt. %, preferably up to 68 wt. %, preferably up to 66 wt. %, preferably up to 64 wt. %, preferably up to 62 wt. %, preferably up to 60 wt. %, based on a total weight of the slurry composition. In previous slurry systems, such high active ingredient content is generally not possible whilst maintaining a stable suspension at a pumpable viscosity. For example, previous systems utilizing up to 45 wt. % friction reducing polymers as active ingredient, and even in previous systems having a modest loading of 15 to 35 wt. % active ingredient, suffer from poor physical stability over time such as unacceptable phase separation (unacceptable levels of solid settling and/or splitting) and gelation when exposed to hot weather conditions. Furthermore, these previous systems may not recover to a usable viscosity when subject to freeze/thaw conditions common to winter seasons.

Depending on the application and the conditions encountered during a particular application, the active ingredient (E) may be an organic polymer (E1), an inorganic material (E2), or a combination thereof.

(E1) Organic Polymer

A wide range of organic polymers (E1) may be employed as the active ingredient (E) herein, including, but not limited to, a biopolymer or polymer extracted from natural sources, for example polysaccharides such as guar gum, starch, xanthan gum, diutan gum, welan gum, glucomannan, succinoglycan, and scleroglucane; chemically modified biopolymers/natural polymers, such as cellulose ethers (e.g., hydroxyethyl cellulose, hydrophobically modified hydroxyethyl cellulose, hydroxypropyl cellulose, methyl hydroxyethyl cellulose, methyl hydroxypropyl cellulose, carboxymethyl cellulose, polyanionic cellulose (PAC), carboxymethyl hydroxyethyl cellulose), modified starches (e.g., starch ethers), modified polysaccharides (e.g., o-carboxychitosan), and guar derivatives (e.g., hydroxypropyl guar, hydrophobically modified hydroxypropyl guar, carboxymethyl guar, carboxymethyl hydroxypropyl guar); or a synthetic polymer, including both homopolymers and copolymers of polyacrylamides, polyacrylates, polyalkylene oxides (e.g., polyethylene oxide), polydiallyl amines (e.g., polydiallyldimethylammonium chloride), polystyrenes, maleic acid, polyolefins (e.g., polyethylene); as well as mixtures thereof. For oil and gas well servicing operations, specific mention is made to polyacrylamide, guar gum, hydroxyethyl cellulose, methyl hydroxyethyl cellulose, carboxymethyl cellulose, and xanthan gum, including mixtures thereof.

<Polyacrylamide> Polyacrylamides have many established uses in oilfield operations such as in drilling, completion, and stimulation operations, the most common applications being for friction reduction in slickwater fracturing fluids, fluid loss control/viscosity improvement, polymer flooding, anti-clay swelling (shale inhibition), and the like.

The term "polyacrylamide" is loosely used herein to describe any polymer formed from an acrylamide monomer(s) component. For example, in many cases, a polyacrylamide is actually a copolymer of acrylamide and one or more other monomer types such as a (meth)acrylate salt (e.g., sodium acrylate, potassium acrylate, etc.), but is nonetheless considered to be a polyacrylamide herein. A polyacrylamide having both acrylamide and acrylate salt monomer units, often referred to as a partially hydrolyzed polyacrylamide (anionic polyacrylamide), is but one example of a polyacrylamide which may be employed in the slurry compositions herein. Such partially hydrolyzed polyacrylamides may be made through copolymerization of at least acrylamide and acrylate salt monomers, or may be made through partial hydrolysis of a polyacrylamide polymer.

Thus when a polyacrylamide is employed as the active ingredient (E), the polyacrylamide may be a polyacrylamide homopolymer or a polyacrylamide copolymer. Suitable polyacrylamide copolymers are those formed from acrylamide and at least one additional monomer unit including, but not limited to:

substituted acrylamide monomers, which may be non-ionic, anionic, cationic, and/or a Mannich-type substituted acrylamide monomer, such as N-alkylacrylamide (e.g., N-methylacrylamide, N-ethylacrylamide, N-isopropylacrylamide), N,N-dialkylacrylamide (e.g., N,N-dimethylacrylamide, N,N-diethylacrylamide), N-alkylacrylamides with heteroatom substitution (e.g., N-(2-hydroxypropyl)acrylamide, N-methylolacrylamide), N,N-dialkylacrylamides with heteroatom substitution, sulfonated acrylamides (e.g., 2-acrylamido-2-methylpropane sulfonic acid and salts thereof (AMPS)), quaternized ammonium acrylamides (e.g., 3-acrylamidopropyltrimethylammonium chloride (ATAC)), and crosslinking monomers such as bisacrylamide monomers (e.g., N,N'-methylenebisacrylamide);

(meth)acrylates such as (meth)acrylic acid, (meth)acrylate salts (e.g., sodium acrylate, potassium acrylate, etc.), (meth)acrylate alkyl esters (e.g., methyl acrylate, ethyl acrylate, isopropyl acrylate, n-butyl acrylate), (meth)acrylate monomers with heteroatom substitution (e.g., ethylene glycol monoacrylate, diethylene glycol monoacrylate, polyethylene glycol monoacrylate, ethylene glycol monomethacrylate, diethylene glycol monomethacrylate, polyethylene glycol monomethacrylate 1,6-hexanediol monoacrylate, 1,6-hexanediol monomethacrylate), and quaternized ammonium (meth)acrylates (e.g., acryloyloxyethyltrimethyl ammonium chloride (DMAEA-Q), vinyl or allyl monomers such as N-vinylamides (e.g., N-vinyl-2-pyrrolidone (NVP) and N-vinyl-2-caprolactam), styrenes (e.g., styrene, divinylbenzenes), heteroaryl-containing vinyl/allyl monomers (e.g., N-vinylpyridine), sulfonated vinyl/allyl monomers (e.g., vinylsulfonic acid and salts thereof, methyl styrenesulfonate, sodium styrene sulfonate), quaternized ammonium vinyl/allyl monomers (e.g., diallyldiethylammonium chloride, diallyldimethyl ammonium chloride (DADMAC)), olefins (e.g., 1-propene, isobutene, 1-hexene), vinyl ether monomers (e.g., hydroxybutyl vinyl ether, cyclohexyl vinyl ether), and vinyl ketones (e.g., methyl vinyl ketone);

including mixtures thereof, with specific mention being made to acrylamide-AMPS-acrylate terpolymers and acrylamide-AMPS-NVP terpolymers.

The selection of an appropriate polyacrylamide depends upon the application (e.g., for slickwater friction reduction), the operating conditions, and compatibility considerations. For that purpose, anionic, cationic, and non-ionic polyacrylamides are each available for use in the disclosed slurry compositions. For example, polyacrylamides might be manufactured with anionic sulfonated monomers units (e.g., 2-acrylamido-2-methylpropane sulfonic acid (AMPS)), for example with sulfonation levels as high as 35 mol %, for enhanced temperature stability and/or salt tolerance.

Further, the molecular weight of the polyacrylamide may be adjusted from less than 2 million g/mol to up to 50 million g/mol (weight average) to suit a particular function. For example, when the polyacrylamide is to be employed as a friction reducer, the polyacrylamide will typically have a weight average molecular weight of at least 5 million g/mol, preferably at least 8 million g/mol, more preferably at least 10 million g/mol, even more preferably at least 12 million g/mol, yet even more preferably at least 15 million g/mol, and up to 50 million g/mol, preferably up to 40 million g/mol, more preferably up to 30 million g/mol, even more preferably up to 25 million g/mol, yet even more preferably up to 20 million g/mol.

Preferred polyacrylamides employed herein are in the form of dry powders having a particle size distribution (PSD) of less than 1 mm, preferably less than 800 μm, preferably less than 600 μm, preferably less than 400 μm, more preferably less than 300 μm, even more preferably less than 200 μm, yet even more preferably less than 150 μm.

Examples of polyacrylamides that may be used as the active ingredient (E) herein include, but are not limited to FLOJET products such as FLOJET DRP 2340 (powder anionic), FLOJET 1130 (powder, anionic), FLOJET DRP 419 (powder, cationic), FLOJET 2340 X (rapid hydrating powder, anionic), and FLOJET DRP 1130 X (rapid hydrating powder, anionic); FLOWPAM products including both FLOPAM carboxylates and sulfonated FLOPAM products; FLOWDRILL products such as FLODRILL PAM1040 (high molecular weight, anionic), FLODRILL TS056 (low molecular weight, low cationic), and FLOWDRILL DB45CR (highly cationic); and FLOWQUAT products such as FLOQUAT FL 2250 (very low molecular weight, highly cationic) and FLOQUAT TS 45RD (very low molecular weight, highly cationic), each available from SNF.

<Guar gum> Guar gum is a galactomannan polysaccharide extracted from guar beans, typically from guar seeds which are mechanically dehusked, hydrated, milled and screened according to application. Various grades of slurriable guar gum may be employed herein depending on the application, for example non-ionic guar gums passing 300 mesh sieves or less, 200 mesh sieves or less, or 100 mesh sieves or less and having low, medium, or high viscosities. In some embodiments, the guar gum has a Brookfield viscosity as a 1 wt. % solution of at least 2,500 cP, preferably at least 3,000 cP, preferably at least 3,500 cP, more preferably at least 4,000 cP, even more preferably at least 4,500 cP, yet even more preferably at least 5,000 cP, and up to 9,000 cP, preferably up to 8,000 cP, more preferably up to 7,000 cP, even more preferably up to 6,000 cP, yet even more preferably up to 5,500 cP.

Guar gums which are categorized as fast hydration guar gums, for example, those which achieve more than 75%, preferably more than 80%, more preferably more than 85% of its final viscosity after 3 to 5 minutes of mixing with an aqueous fluid (e.g., water or brine), as well as crosslinked guar gums, such as those crosslinked with borate, epichlorohydrin, or dialdehydes (e.g., glyoxal, glutaraldehyde), may also be used herein.

Specific examples of acceptable guar gums may include, but are not limited to, fast hydrating guar gum powder, available from Rama Industries, and industrial grade guar gum powder in 100 Mesh, 200 Mesh, or 300 Mesh particle sizes, available from Altrafine Gums.

<Hydroxyethyl cellulose> Hydroxyethyl cellulose (HEC) is a cellulose derivative with hydroxyethyl groups ($-CH_2CH_2OH$) or polyoxyethylene groups ($-(CH_2-CH_2-O)_m-H$) bound to some of the hydroxyl groups of the glucopyranose monomers that make up the cellulose backbone (comprised of $\beta(1\text{-}4)$ linked D-glucose units), typically made by hydroxyethylating the unsubstituted anhydroglucose units of cellulose with ethylene oxide. The hydroxyethyl cellulose used herein may have any molar substitution (M.S.), defined as the mols of substituent groups, in this case hydroxyethyl groups, per anhydroglucose unit, with preferred M.S. values being at least 0.5, preferably at least 1.0, preferably at least 1.2, more preferably at least 1.4, even more preferably at least 1.6, yet even more preferably at least 1.8, and up to 3.5, preferably up to 3.0, preferably up to 2.6, preferably up to 2.5, preferably up to 2.3, more preferably up to 2.1, even more preferably up to 2.0, yet even more preferably up to 1.9. The hydroxyethyl cellulose used herein may also have any degree of substitution (D.S.), defined as the number of hydroxyl groups substituted per anhydroglucose unit, with those having a D.S. of at least 0.5, preferably at least 0.75, more preferably at least 1.0, even more preferably at least 1.25, and up to 2.0, preferably up to 1.75, more preferably up to 1.5 being the most preferred.

In some embodiments, the hydroxyethyl celluloses employed herein have a weight average molecular weight of at least 80,000 g/mol, preferably at least 90,000 g/mol, preferably at least 100,000 g/mol, preferably at least 120,000 g/mol, preferably at least 140,000 g/mol, more preferably at least 160,000 g/mol, even more preferably at least 180,000 g/mol, yet even more preferably at least 200,000 g/mol, and up to 1,300,000 g/mol, preferably up to 1,000,000 g/mol, preferably up to 800,000 g/mol, preferably up to 700,000 g/mol, preferably up to 600,000 g/mol, preferably up to 500,000 g/mol, preferably up to 400,000 g/mol, more preferably up to 300,000 g/mol, even more preferably up to 250,000 g/mol, yet even more preferably up to 220,000 g/mol.

Generally speaking, the viscosity of the hydroxyethyl cellulose will increase as a function of the molecular weight, and both low viscosity (e.g., 25 to 400 cP as a 2 wt. % solution) up to high viscosity (e.g., 7,000 cP or more as a 1 wt. % solution) hydroxyethyl celluloses may be used herein (Brookfield). Hydroxyethyl celluloses which are cross-linked, for example with glyoxal, for ready solubility in cold water, may also be used as an active ingredient (E) herein.

Suitable hydroxyethyl celluloses may include, but are not limited to, NATROSOL products such as NATROSOL 250 LR (a non-ionic, water-soluble, low molecular weight hydroxyethyl cellulose surface-treated with glyoxal), NATROSOL 250 MBR (a non-ionic, water-soluble, medium molecular weight hydroxyethyl cellulose surface-treated with glyoxal), NATROSOL 250 MBR PA, and NATROSOL HHX (a non-ionic, water-soluble, high molecular weight hydroxyethyl cellulose), each available from Ashland.

<Methyl hydroxyethyl cellulose> Methyl hydroxyethyl cellulose (MHEC) is a cellulose derivative with both hydroxyethyl groups (or polyoxyethylene groups) and methyl groups bound to some of the hydroxyl groups of the glucopyranose monomers. The MHEC employed herein may have any substitution content. Typically, the methyl hydroxyethyl celluloses have a molar substitution (M.S.) of hydroxyethyl groups of at least 0.05, preferably at least 0.1, preferably at least 0.2, more preferably at least 0.3, even more preferably at least 0.4, yet even more preferably at least 0.5, and up to 1.0, preferably up to 0.9, more preferably up to 0.8, even more preferably up to 0.7, yet even more preferably up to 0.6, and a degree of substitution (D.S.) of methyl groups of at least 0.8, preferably at least 1, more preferably at least 1.2, even more preferably at least 1.25, and up to 2.5, preferably up to 2.4, more preferably up to 2.2.

Methyl hydroxyethyl cellulose is available in a wide range of viscosities (e.g., from about 500 cP to products having a viscosity of ≥70,000 cP, as a 2 wt. % solution). While formulations containing any methyl hydroxyethyl cellulose are contemplated, preferred MHECs are those having a Brookfield viscosity as a 2 wt. % solution of at least 2,000 cP, preferably at least 3,000 cP, preferably at least 4,000 cP, more preferably at least 5,000 cP, even more preferably at least 6,000 cP, yet even more preferably at least 6,500 cP, and up to 30,000 cP, preferably up to 25,000 cP, preferably up to 20,000 cP, preferably up to 15,000 cP, more preferably up to 10,000 cP, even more preferably up to 8,000 cP, yet even more preferably up to 7,000 cP.

Specific examples of suitable methyl hydroxyethyl celluloses may include, but are not limited to, CULMINAL products such as CULMINAL MHEC 6000 PR (a water-soluble, non-ionic, methyl hydroxyethyl cellulose with retarded solubility and a Brookfield viscosity as a 2 wt. % solution of 6,000-8,000 cP, available from Ashland), CULMINAL MHEC 6000 PFS (a water-soluble, non-ionic, methyl hydroxyethyl cellulose with a Brookfield viscosity as a 2 wt. % solution of 6,500-8,000 cP, available from Ashland), and WALOCEL products such as WALOCEL MKX 6000 PF01 (a methyl hydroxyethyl cellulose with a viscosity as a 2 wt. % solution of 5,500-7,000 cP, available from Dow).

<Carboxymethyl cellulose> Carboxymethyl cellulose (CMC) is a cellulose derivative with carboxymethyl groups ($-CH_2-COOH$) bound to some of the hydroxyl groups of the glucopyranose monomers. Carboxymethyl cellulose may be in the form of a free acid or a carboxylate salt (e.g., sodium salt), preferably the carboxymethyl cellulose used herein is a sodium salt. The carboxymethyl cellulose employed in the present disclosure may have any degree of substitution (D.S.), for example a D.S. of at least 0.6, preferably at least 0.7, more preferably at least 0.8, even more preferably at least 0.9, yet even more preferably at least 1.0, and up to 1.5, preferably up to 1.4, more preferably up to 1.3, even more preferably up to 1.2, yet even more preferably up to 1.1, with a medium to high D.S. (0.9-1.5) being most preferred. Carboxymethyl cellulose is also available in a wide range of viscosities, ranging from low viscosity (e.g., 50 to 200 cP as a 4 wt. % solution), medium viscosity (e.g., 400 to 800 cP as a 2 wt. % solution), and high viscosity (e.g., 1,300 to 2,200 cP as a 1 wt. % solution), any of which may be used herein. Preferably, the carboxymethyl cellulose employed in the disclosed slurry compositions is a high viscosity CMC, having a viscosity as a 1 wt. % solution of at least 1,300 cP, preferably at least 1,400 cP, more preferably at least 1,500 cP, even more preferably at least 1,600 cP, yet even more preferably at least 1,700 cP, and up to 2,200 cP, preferably up to 2,100 cP, more preferably up to 2,000 cP, even more preferably up to 1,900 cP, yet even more preferably up to 1,800 cP. Examples of acceptable carboxymethyl celluloses may include, but are not limited to, AQUALON products available from Ashland such as AQUALON CMC 9H7F (a sodium carboxymethyl cellulose having a medium D.S. and a high viscosity).

<Xanthan gum> Xanthan Gum (also referred to as "XC polymer") is commercially produced by fermentation, using a pure culture strain of *Xanthomonas Campestris* with glucose and related chemicals as substrates, followed by purification and recovery with an alcohol solvent. The primary structure of xanthan gum is a backbone of 1,4-linked β-D-glucose with side chains containing two mannose and one glucoronic acid. Xanthan gum has many established uses in oilfield operations and can be employed herein for horizontal drilling and completions, drill-in fluids, drilling large-diameter wellbores, coring fluids, hole cleaning, workover fluids, gravel packing operations, perforating fluids, crosslinked profile modification, acid viscosification, among many others, and may be used in fresh water, brackish water, salt water, and brine-based aqueous fluids. High purity xanthan gums are widely available, most commonly in 80 to 100 mesh powder form, though the particle size can vary depending on the desired specifications ranging from larger agglomerated product to fine 200 mesh powders. Specific examples of xanthan gums may include, but are not limited to, FLOWZAN BIOPOLYMER, which is a high purity xanthan gum available from Chevron Phillips Chemical Company, LP, and SATIAXANE products such as SATIAXANE CX 90 T (which is an 80 mesh (<180 μm) xanthan gum available from Cargill.

It should be understood that the specifications of molecular weight, viscosity, particle size, and/or degree/molar substitution provided for the organic polymers (E1) above are to illustrate the types of organic polymers (E1) most common to oil field environments, but that there are many products and product specifications available, including products designed for other applications (e.g., paper coating applications, water treatment applications, pulp and paper applications, construction applications, coating applications, and the like) and/or for other sets of circumstances (e.g. high temperature, high salinity, acidic fluids, etc.). A person of ordinary skill will have the ability to select an appropriate organic polymer (E1) with the appropriate specifications to meet their requirements, which may include use of organic polymers (E1) having product specifications (e.g., molecular weight, viscosity, particle size, and/or degree/molar substitution) outside of the ranges recited above, and these organic polymers (E1) are also contemplated for use in the disclosed slurry compositions.

(E2) Inorganic Materials

A wide range of inorganic materials (E2) may be employed as the active ingredient (E) herein, including, but not limited to, calcium carbonate ($CaCO_3$) such as calcite, vaterite, aragonite, marble, limestone; dolomite; tricalcium phosphate ($Ca_3(PO_4)_2$); dicalcium phosphate (or calcium monohydrogen phosphate, $CaHPO_4$); titanium oxide ($TiO_2$); calcium oxide (CaO); calcium hydroxide ($Ca(OH)_2$); sodium carbonate ($Na_2CO_3$); sodium bicarbonate ($NaHCO_3$); and borates including both refined and mineral borates (e.g., ulexite); as well as mixtures thereof. Specific mention is made to calcium carbonate ($CaCO_3$), titanium oxide ($TiO_2$), and ulexite.

The slurry compositions may be formulated with inorganic materials (E2) of various particle sizes, with typical particle size values being less than 500 μm, preferably less than 400 μm, preferably less than 300 μm, preferably less than 200 μm, preferably less than 100 μm, preferably less than 50 μm, more preferably less than 25 μm, even more preferably less than 15 μm, yet even more preferably less than 10 μm.

Exemplary inorganic materials (E2) may include, but are not limited to, IMERFILL calcium carbonate products available from Imerys such as IMERFILL 25 (ground white marble, $CaCO_3$, with a median particle size of 25 μm), IMERFILL 15 (ground white marble, $CaCO_3$, with a median particle size of 15 μm), and IMERFILL 3 (ground white marble, $CaCO_3$, with a median particle size of 3 μm); TI-PURE products available from Chemours such as TI-PURE R-960 (a ground rutile $TiO_2$); and ground ulexite products (e.g., those having a median particle size of 45 μm, available from American Borate Company).

Properties

Among other advantages, the slurry compositions of the present disclosure can be formulated with a high solids loading (e.g., up to 75 wt. %) while being both pumpable and stable.

Slurry compositions are deemed "pumpable" (or "fluid") herein when achieving a viscosity (Brookfield at 25° C. and 30 rpm) of below 5,000 cPs. On the other hand, slurry compositions which are not pumpable are considered "gels" having a viscosity of 5,000 cPs or greater. In preferred embodiments, the slurry compositions disclosed herein are "pumpable" (or "fluid") with an initial viscosity at 25° C. and 30 rpm (Brookfield) of below 5,000 cP, preferably below 4,500 cP, preferably below 4,000 cP, preferably below 3,500 cP, preferably below 3,000 cP, preferably below 2,500 cP, preferably below 2,000 cP, preferably below 1,800 cP, preferably below 1,600 cP, preferably below 1,400 cP, preferably below 1,200 cP, preferably below 1,000 cP, preferably below 800 cP, preferably below 600 cP, more preferably below 400 cP, even more preferably below 300 cP, yet even more preferably below 250 cP.

Slurry compositions are deemed "stable" herein when they meet at least one, preferably at least two, preferably at least three, preferably all of the following stability criteria:
  (i) remain pumpable (resist gelation) when aged for at least 4 weeks at ambient temperature (i.e., 18 to 28° C.);
  (ii) remain pumpable (resist gelation) when aged for at least 4 weeks at elevated temperature (e.g., 40 to 60° C.);
  (iii) have a phase separation of less than 5%, in terms of wt. % settled solids and/or vol. % oil phase separation, when aged for at least 4 weeks at elevated temperature (e.g., 40 to 60° C.); and (iv) remain pumpable (resist gelation) after being subject to 3 or more freeze/thaw cycles.

In preferred embodiments, the slurry compositions of the present disclosure are stable (remain pumpable) when aged for at least 4 weeks, preferably at least 5 weeks, preferably at least 6 weeks, preferably at least 7 weeks, preferably at least 8 weeks, preferably at least 9 weeks, preferably at least 10 weeks, more preferably at least 3 months, even more preferably at least 6 months, yet even more preferably at least 1 year at ambient temperature (i.e., 18 to 28° C., or 20 to 25° C.).

In preferred embodiments, the slurry compositions of the present disclosure are stable (remain pumpable) when aged for at least 4 weeks, preferably at least 5 weeks, preferably at least 6 weeks, preferably at least 7 weeks, preferably at least 8 weeks, preferably at least 9 weeks, preferably at least 10 weeks, more preferably at least 3 months, even more preferably at least 6 months, yet even more preferably at least 1 year at elevated temperatures such as at least 40° C., preferably at least 45° C., more preferably at least 50° C., and up to 60° C., preferably up to 55° C.

In preferred embodiments, the slurry compositions of the present disclosure are stable in terms of having a % phase separation (wt. % settled solids, vol. % oil phase separation, or both) of less than 5%, preferably less than 4%, preferably less than 3%, more preferably less than 2%, even more preferably less than 1%/0, yet even more preferably 0% when aged for at least 4 weeks, preferably at least 5 weeks, preferably at least 6 weeks, preferably at least 7 weeks, preferably at least 8 weeks, preferably at least 9 weeks, preferably at least 10 weeks, more preferably at least 3 months, even more preferably at least 6 months, yet even more preferably at least 1 year at elevated temperatures such as at least 40° C., preferably at least 45° C., more preferably at least 50° C., and up to 60° C., preferably up to 55° C.

In preferred embodiments, the slurry compositions of the present disclosure are stable (remain pumpable) after being subject to 3 or more freeze/thaw cycles, preferably 4 or more freeze/thaw cycles, preferably 5 or more freeze/thaw cycles, more preferably 6 or more freeze/thaw cycles, even more preferably 7 or more freeze/thaw cycles, yet even more preferably 8 or more freeze/thaw cycles, for example up to 10 freeze/thaw cycles.

Methods of Making

Various methods may be used to prepare the slurry compositions of the present disclosure, and such methods are generally known to those of ordinary skill in the art. One non-limiting example will now be described.

The solvent (A) (e.g., mineral oil) may first be placed into an appropriate container, and the suspension aid (B) may be added under agitation (e.g., mixing on a benchtop mixer). Heat (e.g., 35 to 55° C.) may be optionally applied at this point for heat activating the suspension aid. Alternatively, the suspension aid (B) may be chemically activated by addition of the polar activator (C) under continued agitation. Regardless of whether the suspension aid (B) is heat activated or chemically activated via the polar activator (C), the suspension is preferably agitated for at least 30 minutes, preferably at least 40 minutes, preferably at least 45 minutes, or until sufficient swelling of the suspension aid (B) occurs.

Next, the alkoxylated fatty amine (D) may be added to stabilize the suspension, and at this point, a noticeable drop in viscosity preferably occurs. Continued agitation of the resulting premix may be performed to ensure adequate dispersion. To prepare the final slurry compositions, an appropriate amount of the active ingredient (E), such as organic polymer (E1) or inorganic material (E2), may then be added and the slurry composition may be mixed for a sufficient time to ensure the slurry composition is a homogenous suspension, for example mixing for up to 45 minutes, preferably up to 30 minutes, more preferably up to 15 minutes, even more preferably up to 5 minutes.

II. Concentrated Slurry Base

According to a second aspect, the present disclosure is directed to a concentrated slurry base, which may be used as an easily transportable pre-formed stock for forming the slurry composition. In effect, the concentrated slurry base may be dosed with a desired amount of active ingredient (E) and diluted with solvent (A) to form the final slurry composition, on-site or otherwise. The concentrated slurry base may contain (A) the solvent, (B) the suspension aid, (C) the polar activator, and (D) the alkoxylated fatty amine, all of which having been described previously, and all of which are present in the concentrated slurry base in a higher concentration than they will eventually appear in any slurry composition prepared therefrom.

For example, the solvent (A) may be present in an amount of at least 50 wt. %, preferably at least 55 wt. %, preferably at least 60 wt. %, more preferably at least 65 wt. %, even more preferably at least 70 wt. %, yet even more preferably at least 75 wt. %, and up to 85 wt. %, preferably up to 83 wt. %, more preferably up to 81 wt. %, even more preferably up to 79 wt. %, yet even more preferably up to 77 wt. %;

the suspension aid (B) may be present in an amount of at least 1 wt. %, preferably at least 2 wt. % c, preferably at least 4 wt. %, more preferably at least 6 wt. %, even more preferably at least 8 wt. %, yet even more preferably at least 10 wt. %, and up to 20 wt. %, preferably up to 18 wt. %, more preferably up to 16 wt. %, even more preferably up to 14 wt. %, yet even more preferably up to 12 wt. %;

the polar activator (C) may be present in an amount of at least 0.1 wt. %, preferably at least 0.5 wt. %, preferably at least 1 wt. %, preferably at least 1.5 wt. %, more preferably at least 2 wt. %, even more preferably at least 2.5 wt. %/o, yet even more preferably at least 3 wt. %, and up to 15 wt. %, preferably up to 13 wt. %, preferably up to 11 wt. %, preferably up to 9 wt. %, more preferably up to 7 wt. %/0, even more preferably up to 5 wt. %, yet even more preferably up to 4 wt. %; and the alkoxylated fatty amine (D) may be present in an amount of at least 1 wt. %, preferably at least 3 wt. %0, preferably at least 5 wt. %, preferably at least 7 wt. %, more preferably at least 8 wt. %, even more preferably at least 9 wt. %, yet even more preferably at least 10 wt. %, and up to 30 wt. %, preferably up to 25 wt. %, preferably up to 20 wt. %, more preferably up to 15 wt. %, even more preferably up to 13 wt. %, yet even more preferably up to 11 wt. %; each based on a total weight of the concentrated slurry base.

Then, to prepare for use, the concentrated slurry base may be further diluted with additional solvent (A) (e.g., mineral oil) and dosed with an appropriate amount of active ingredient (E) (e.g., up to 75 wt. % as described previously) to form the slurry composition. In such a way, the concentrated slurry base may account for at least 10 wt. %, preferably at least 12 wt. %, preferably at least 14 wt. %, more preferably at least 16 wt. %, even more preferably at least 18 wt. %, yet even more preferably at least 20 wt. %, and up to 30 wt. %, preferably up to 28 wt. %, more preferably up to 26 wt. %, even more preferably up to 24 wt. %, yet even more preferably up to 22 wt. %, of the final slurry composition.

Because the concentrated slurry base is substantially free, preferably completely free (0 wt. %) of active ingredient (E), it may be stored without stability issues for extended periods of time (e.g., 4+ weeks). Although concentrated, the concentrated slurry base is advantageously pumpable and stable, owing at least in part to the presence of the alkoxylated fatty amine (D), and this pumpability and stability is carried through to the slurry composition as discussed heretofore. In preferred embodiments, the concentrated slurry base is pumpable and remains pumpable even when stored at elevated temperature (e.g., 40° C.) for extended periods (e.g., 4+ weeks), with an initial viscosity of, and maintaining a viscosity of, less than 5,000 cP, preferably less than 4,000 cP, preferably less than 3,000 cP, preferably less than 2,000 cP, preferably less than 1,800 cP, preferably less than 1,600 cP, more preferably less than 1,500 cP, even more preferably less than 1,400 cP, yet even more preferably less than 1,300 cP.

Practically, to produce the slurry composition from the concentrated slurry base, the concentrated slurry base may be first diluted with solvent (A) at a weight ratio of at least 1:3, preferably at least 1:2, more preferably at least 1:1.5, even more preferably at least 1:1, and up to 3:1, preferably up to 2:1, more preferably up to 1.5:1. Then, the active ingredient (E) may be added to provide the slurry composition having the appropriate active ingredient (E) dosage. In one example, to produce a slurry composition having 60 wt. % active ingredient (E), the concentrated slurry base may be diluted with the same amount of solvent (A) (1/1 part), then 3 parts of the active ingredient (E) may be added under mixing. In another example, to produce a slurry composition having 50 wt. % active ingredient (E), the concentrated slurry base may be diluted with the same amount of solvent (A) (1/1 part), then 2 parts of the active ingredient (E) may be added under mixing. In yet another example, to produce a slurry composition having 75 wt. % active ingredient (E), the concentrated slurry base may be diluted with the same amount of solvent (A) (1/1 part), then 6 parts of the active ingredient (E) may be added under mixing. The final slurry composition can be prepared by the suspension manufacturer or end-user on demand (as needed and when needed).

The concentrated slurry base offers slurry formulators several advantages. Among these, the use of the concentrated slurry base minimizes long distance product transportation and the associated transportation costs. The concentrated slurry base also minimizes the risk of physical stability/phase separation related issues. Furthermore, the concentrated slurry base does not require high shear mixing conditions to make the final slurry composition, providing convenience and further cost savings.

III. Methods of Treating a Subterranean Formation

According to a third aspect, the present disclosure is directed to a method of treating a subterranean formation with a treatment fluid made using the slurry composition, in one or more of its embodiments.

Petroleum oil and natural gas wells are typically subjected to numerous operations/chemical treatments during their production life to enhance operation and protect the integrity of the asset. The slurry compositions presented here may be formulated with any active ingredient (E) suitable for use in any such operation/treatment process, both onshore and offshore, including drilling operations (e.g., to clean the hole, to balance formation pressure, to support/stabilize the wellbore, to prevent/minimize formation damage, to cool/lubricate the bit, to transmit hydraulic power to the bit, to facilitate analysis of the producing formation), cementing operations (e.g., primary cementing/zonal isolation, squeeze cementing, plug cementing), completion operations (e.g., casing, perforating, gravel packing), workover operations (e.g., through-tubing workover such as wireline, coiled tubing or snubbing), stimulation operations (e.g., acidizing, fracking, enhanced oil recovery etc.), or any other oil/gas recovery operation which facilitates bringing crude oil/gas to the surface for transport and/or processing.

The method may first involve mixing the slurry composition, in one or more of its embodiments, with an aqueous fluid to form a treatment fluid, for example, a drilling fluid, a cementing fluid, a completion fluid, a workover fluid, or a stimulation fluid. Upon being brought into contact with the aqueous fluid, the active ingredient (E), for example a polyacrylamide friction reducer, may be solvated, hydrated, and/or swelled to ultimately provide the treatment fluid with an apparent viscosity useful for one or more of the above operations.

The aqueous fluid may be fresh water, which is water having a total dissolved solids (TDS) content of less than 1,000 mg/L (e.g., water obtained from natural fresh water sources such as lakes, streams, rivers, etc.); brackish water, which is water having a TDS of 1,000 mg/L to 10,000 mg/L; salt water, which is water having a TDS of greater than 10,000 mg/L and up to 35,000 mg/L (e.g, seawater, coastal aquifers), and/or a brine (a simple or a complex brine), which is water having a TDS of greater than 35,000 mg/L (e.g., produced water). Thus, in some embodiments, the treatment fluid may be formed from slurry compositions mixed with aqueous fluids having a total dissolved solids (TDS) content of up to 400,000 mg/L, preferably up to 350,000 mg/L, preferably up to 300,000 mg/L, preferably up to 250,000 mg/L, preferably up to 200,000 mg/L, preferably up to 150,000 mg/L, preferably up to 100,000 mg/L, preferably up to 80,000 mg/L, preferably up to 60,000 mg/L, preferably up to 40,000 mg/L, preferably up to 30,000 mg/L, preferably up to 20,000 mg/L, preferably up to 15,000 mg/L, preferably up to 10,000 mg/L, preferably up to 5,000 mg/L, preferably up to 4,000 mg/L, preferably up to 3,000 mg/L, preferably up to 2,000 mg/L, preferably up to 1,000 mg/L, preferably up to 800 mg/L, preferably up to 600 mg/L, preferably up to 400 mg/L, more preferably up to 200 mg/L, even more preferably up to 100 mg/L, yet even more preferably up to 50 mg/L. For example, the slurry compositions may be formulated with an active ingredient (E) designed for use with high salt content aqueous systems, such as a polyacrylamide copolymer containing sulfonated monomers units (e.g., 2-acrylamido-2-methylpropane sulfonic acid (AMPS)).

Representative examples of cations which may be optionally present in the aqueous fluid (and thus the treatment fluid) include, but are not limited to, sodium, potassium, magnesium, calcium, strontium, barium, iron (ferrous and ferric), lead, copper, cobalt, manganese, nickel, zinc, aluminum, chromium, and titanium, as well as mixtures thereof. Representative examples of anions which may be present in the aqueous fluid (and thus the treatment fluid) include, but are not limited to, chloride, carbonate, bicarbonate, sulfate, bromide, iodide, acetate, hydroxide, sulfide, hydrosulfide, chlorate, fluoride, hypochlorite, nitrate, nitrite, perchlorate, peroxide, phosphate, phosphite, sulfite, hydrogen phosphate, hydrogen sulfate, as well as mixtures thereof.

The pH of the treatment fluid may also vary or be adjusted with various pH regulating agents (e.g., $H_2SO_4$, HCl, NaOH) to suit a particular application. For example, the treatment fluid may contain up to 20 wt. %, preferably up to 15 wt. %, preferably up to 10 wt. %, preferably up to 5 wt. % c, preferably up to 3 wt. %, preferably up to 1 wt. % of a pH regulating agent, e.g., HCl for fracture acidizing applications. In some embodiments, the treatment fluid has a pH of at least −1, preferably at least 0, preferably at least 1, preferably at least 2, preferably at least 3, preferably at least 4, more preferably at least 5, even more preferably at least 6, yet even more preferably at least 7, and up to 14, preferably up to 13, preferably up to 12, preferably up to 11, more preferably up to 10, even more preferably up to 9, yet even more preferably up to 8.

In addition to the slurry compositions of the present disclosure, the treatment fluids may also optionally contain other various additives/materials in their art appropriate levels for carrying out a desired treatment/operation. A person of ordinary skill in the art will appreciate which additives/materials are commonly employed for different treatment fluids (e.g., for use in drilling fluids, oil well cement slurries, completion fluids, workover fluids, stimulation fluids, and the like), all of which are contemplated for use in the disclosed methods. The slurry compositions offer flexibility in that they may be formulated for compatibility with one or more of such additives/materials, which may include, but are not limited to,

- pH regulating agents e.g., $H_2SO_4$, HCl, NaOH, phosphate buffers such as monosodium phosphate, disodium phosphate, sodium tripolyphosphate buffers, borate buffers;
- viscosity modifying agents e.g., bauxite, bentonite, attapulgite, gypsum, quartz, garnet, basalt, nesosilicates or orthosilicates, sorosilicates, cyclosilicates, inosilicates, phyllosilicates, tectosilicates, kaolins, montmorillonite, fullers earth, halloysite, psyllium husk powder, LAPONITE clays, polyphosphates, lignosulfonates, tannic acid;
- weighting agents e.g., barite, hematite, siderite, ilmenite, taconite, limonite, magnetite;
- chelating agents e.g., ethylene diamine tetraacetic acid (EDTA), diethylene triamine pentaacetic acid (DPTA), hydroxyethylene diamine triacetic acid (HEDTA), ethylene diamine di-ortho-hydroxy-phenyl acetic acid (EDDHA), ethylene diamine di-ortho-hydroxy-paramethyl phenyl acetic acid (EDDHMA), ethylene diamine di-ortho-hydroxy-para-carboxy-phenyl acetic acid (EDDCHA);
- stabilizing agents e.g., glycerol, polysiloxanes and copolymers thereof, acrylic copolymers, alkali metal alginates and other water soluble alginates, polyvinylpyrrolidones;
- corrosion inhibitors e.g., polyureas, chromates, zinc salts, (poly)phosphates, organic phosphorus compounds (phosphonates), acetylenic alcohols such as propargylic alcohol, α,β-unsaturated aldehydes such as cinnameldehyde and crotonaldehyde, aromatic aldehydes such as furfural, p-anisaldehyde, phenones including alkenyl phenones such as phenyl vinyl ketone, nitrogen-containing heterocycles such as imidazolines, piperazines, hexamethylene tetramines, quaternized heteroarenes such as 1-(benzyl)quinolinium chloride, and condensation products of carbonyls and amines such as Schiff bases;
- intensifiers e.g., formic acid, $C_1$-$C_4$ alkyl formates such as methyl formate and ethyl formate, benzyl formate, formamide, dimethyl formamide, 1,1′-azobisformamide, metal halides such as sodium bromide, potassium bromide, sodium iodide, potassium iodide, copper(I) chloride, copper(I) iodide, copper(II) chloride, copper (II) iodide, antimony chloride;
- dispersing agents e.g., polymeric or copolymeric compounds of polyacrylic acid, polyacrylic acid/maleic acid copolymers, styrene/maleic anhydride copolymers, polymethacrylic acid and polyaspartic acid;
- scale inhibitors e.g., phosphate esters, sodium hexametaphosphate, sodium tripolyphosphate, hydroxyethylidene diphosphonic acid, aminotris(methylenephosphonic acid (ATMP), vinyl sulfonic acid, allyl sulfonic acid, polycarboxylic acid polymers, sulfonated polymers such as vinyl monomers having a sulfonic acid group, polyacrylates;
- defoaming agents e.g., silicone oils, silicone oil emulsions, organic defoamers, emulsions of organic defoamers, silicone-organic emulsions, silicone-glycol compounds, silicone/silica adducts, emulsions of silicone/silica adducts;
- proppants e.g., sand, ceramic, silica, quartz, sintered bauxite, or other particulates that prevent fractures from closing when injection is stopped;
- cements e.g., Portland cement
- surfactants or emulsifiers (other than the alkoxylated fatty amine), such as those surfactants described previously;
- clay swelling inhibitors e.g., potassium chloride, potassium bromide, potassium formate, potassium fluoride, potassium iodide, choline chloride, polyamines, tetramethylammonium chloride, and partially hydrolyzed polyacrylamide (PHPA);
- as well as other oil/gas production additives such as winterizers, hydrate inhibitors, asphaltene inhibitors, paraffin inhibitors, $H_2S$ scavengers, $O_2$ scavengers, $CO_2$ scavengers, foamers, accelerators, retarders, extenders, fluid loss additives, lost circulation control additives, water clarifiers, breakers, biocides, crosslinkers, among many others;
- as well as mixtures of any of the above.

The slurry composition may be combined with the aqueous fluid using any suitable method known in the art, including batch or continuous mix processes, as well as manual and automatic addition techniques. For example, mixing may be performed using inline static mixers, inline mixers with velocity gradient control, inline mechanical mixers with variable speed impellers, inline jet mixers, motorized mixers, batch equipment, and appropriate chemical injection pumps and/or metering systems. The chemical injection pump(s) can be automatically or manually controlled to dose any amount of the slurry composition needed for a particular operation. The speed of solvation, hydration, and/or swelling of the active ingredient (E) may be controlled by the mixing conditions, such as the amount of applied shear.

While batch mixing process may be employed, most typically a continuous mixing process is employed whereby the aqueous fluid is withdrawn from its source and treated with the designed slurry composition (and any optional additive/material) while en route to the wellbore. For example, a pumping system can be provided to cycle the aqueous fluid through one or more mixing stations where the slurry compositions as well as any optional additives/materials are added as the aqueous fluid circulates through the pump. In this capacity, a treatment fluid is typically prepared at a well site, but of course may be prepared offsite in certain circumstances.

The slurry composition may be added in any quantity needed to form an appropriate treatment fluid—a skilled artisan will be able to determine the appropriate dosage levels for a particular treatment application, and adjust the slurry composition dosage accordingly.

In one example, the slurry composition is formulated with an active ingredient (E) useful for friction reduction and/or proppant suspension such as a polyacrylamide, guar gum, or hydroxyethyl cellulose, and combined with an aqueous fluid to form a stimulation (e.g., fracking) fluid such as a slickwater fracking fluid or a gel fracking fluid. In such cases, the slurry composition may be employed in an amount of up to 10 gallons per thousand gallons (gptg), for example, at least 0.2 gallons, preferably at least 0.4 gallons, preferably at least 0.6 gallons, preferably at least 0.8 gallons, preferably at least 1 gallon, preferably at least 1.5 gallons, preferably at least 2 gallons, and up to 10 gallons, preferably up to 8 gallons, preferably up to 6 gallons, preferably up to 5 gallons, preferably up to 4 gallons, preferably up to 3 gallons, per thousand gallons of the stimulation fluid.

In another example, the slurry composition is formulated with an active ingredient (E) such as xanthan gum, hydroxyethyl cellulose, or calcium carbonate, and combined with an aqueous fluid to form a completion fluid or a workover fluid. In such cases, the slurry composition may be employed in an amount of up to 10 gallons per barrel (gpb), for example, at least 0.5 gallons, preferably at least 0.7 gallons, preferably at least 0.9 gallons, preferably at least 1 gallon, preferably at least 1.3 gallons, preferably at least 1.5 gallons, preferably at least 2 gallons, and up to 10 gallons, preferably up to 8 gallons, preferably up to 6 gallons, preferably up to 5 gallons, preferably up to 4 gallons, preferably up to 3 gallons, per barrel of the completion/workover fluid.

In another example, the slurry composition is formulated with an active ingredient (E) such as hydroxyethyl cellulose, methyl hydroxyethyl cellulose, methyl hydroxypropyl cellulose, or xanthan gum, and combined with an aqueous fluid along with cement to form a cementing fluid. In such cases, the slurry composition may be employed in an amount of up to 10 gallons per sack of cement (gps), for example, at least 0.1 gallons, preferably at least 0.2 gallons, preferably at least 0.4 gallons, preferably at least 0.6 gallons, preferably at least 0.8 gallons, preferably at least 1 gallon, preferably at least 1.5 gallons, preferably at least 2 gallons, and up to 10 gallons, preferably up to 8 gallons, preferably up to 6 gallons, preferably up to 5 gallons, preferably up to 4 gallons, preferably up to 3 gallons, per sack of cement.

In yet another example, the slurry composition is formulated with an active ingredient (E) such as xanthan gum, carboxymethyl cellulose, polyanionic cellulose, or polyacrylamide, and combined with an aqueous fluid to form a drilling fluid. In such cases, the slurry composition may be employed in an amount of up to 10 gallons per barrel (gpb), for example, at least 0.5 gallons, preferably at least 0.7 gallons, preferably at least 0.9 gallons, preferably at least 1 gallon, preferably at least 1.3 gallons, preferably at least 1.5 gallons, preferably at least 2 gallons, and up to 10 gallons, preferably up to 8 gallons, preferably up to 6 gallons, preferably up to 5 gallons, preferably up to 4 gallons, preferably up to 3 gallons, per barrel of the drilling fluid.

It should be recognized that the dosages recited above are merely exemplary, and many other treatment fluids may be used in the methods herein, including those having concentrations of slurry compositions that fall above or below the presented ranges, as well as treatment fluids which are formulated with various other additives/materials such as those listed previously.

After generating a desired treatment fluid, the treatment fluid may then be introduced into the subterranean geological formation, for example through a wellbore penetrating the subterranean formation. This may be accomplished by pumping, injecting (optionally at high pressures e.g., 5,000 to 15,000 psi), pouring, releasing, displacing, spotting, circulating, or otherwise placing the treatment fluid within a well or wellbore using any suitable manner known in the art. The temperature, pressure, flow rate/injection rate, and/or any other operational parameter known to those of ordinary skill may be adjusted to meet the needs of a particular operation/treatment process.

Beyond applications in the oil and gas industry, the slurry compositions may be employed in other industrial treatment methods including, but not limited to, paper coating applications, water treatment applications, pulp and paper applications, construction applications, and coating applications.

The examples below are intended to further illustrate the slurry compositions and the concentrated slurry bases, and are not intended to limit the scope of the claims.

EXAMPLES

Slurry Composition Preparation Procedure with Chemical Activation

I. Standard Slurry Composition Preparation Procedure (One Step Process) and Testing Protocol:
- The solvent (e.g., mineral oil) was weighed into an empty container, and placed under a benchtop mixer.
- Under agitation, the suspension aid (e.g., organophilic clay) was dispersed.
- Under agitation, the polar activator was added.
- The suspension aid was allowed to swell for at least 30 minutes.
- Under agitation, the stabilizer/surfactant was added to stabilize the slurry. The viscosity of the dispersion drops significantly.
- The dispersion was mixed for a sufficient time to allow for good dispersion of the premix.
- The Brookfield viscosity of the premix was measured/recorded at 30 rpm using the appropriate spindle for the viscosity level.
- To prepare the final high solids slurry composition, the appropriate amount of organic polymer or inorganic material was added to the premix, and allowed to mix for a sufficient time to ensure a homogenous and stable slurry composition.
- At the end of the preparation, the Brookfield viscosity was measured and recorded as "initial viscosity after preparation"
- The slurry composition was split into two separate containers for the long term stability testing
  - One container was kept at ambient temperature, and the other container was stored in an oven at 40° C.
  - The viscosity was measured after 24 hrs, 1 week, 2 weeks, 3 weeks and 4 weeks after day of preparation.
  - After 4 weeks at 40° C., the physical stability was measured and recorded according to phase separation, if any.

II. Slurry Composition Preparation Procedure from Concentrated Slurry Base (Two Steps Process) and Testing Protocol
Concentrated Slurry Base Preparation (Step 1):
- The solvent (e.g., mineral oil) was weighed into an empty container, and placed under a benchtop mixer.
- Under agitation, the suspension aid (e.g., organophilic clay) was dispersed.
- Under agitation, the polar activator was added.
- The suspension aid was allowed to swell for at least 30 minutes.
- Under agitation, the stabilizer/surfactant was added to stabilize the slurry. The viscosity of the concentrated slurry base drops significantly.

The concentrated slurry base was mixed for a sufficient time to allow for good dispersion.

The Brookfield viscosity of the concentrated slurry base was measured/recorded at 30 rpm using the appropriate spindle for the viscosity level.

Slurry Composition Preparation (Step 2):

20 wt. % of the concentrated slurry base was weighed out into a container.

Under agitation, 20 wt. % of the solvent (e.g., mineral oil) was used to dilute the concentrated slurry base.

Under agitation, 60 wt. % (for high solids slurry compositions) of organic polymer/inorganic material was added and allowed to mix for a sufficient time to ensure a homogenous and stable slurry. Note: other concentrations of organic polymer/inorganic material can also be used.

At the end of the preparation, the Brookfield viscosity was measured and recorded as "initial viscosity after preparation".

The slurry composition was split into two separate containers for the long term stability testing One container was kept at ambient temperature, and the other container was stored in an oven at 40° C.

The viscosity was measured after 24 hrs, 1 week, 2 weeks, 3 weeks and 4 weeks after day of preparation.

After 4 weeks at 40° C., the physical stability was measured and recorded according to phase separation, if any.

Slurry Composition Preparation Procedure with Heat Activation (One Step Process) and Testing Protocol:

The solvent (e.g., mineral oil) was weighed into an empty container, and placed under a benchtop mixer.

Under agitation, the suspension aid (e.g., organophilic clay) was dispersed.

Under agitation, the dispersion was heated up to 40-45° C.

After reaching a temperature of 40-45° C., the agitation was continued for least an additional 30 minutes at temperature.

Under agitation, the dispersion was cooled down to ambient temperature.

Under agitation, the stabilizer/surfactant was added to stabilize the slurry. The viscosity of the dispersion drops significantly.

The dispersion was mixed for a sufficient time to allow for good dispersion of the premix.

The Brookfield viscosity of the premix was measured/recorded at 30 rpm using the appropriate spindle for the viscosity level.

To prepare the final high solids slurry composition, the appropriate amount of organic polymer or inorganic material was added to the premix, and allowed to mix for a sufficient time to ensure a homogenous and stable slurry composition.

At the end of the preparation, the Brookfield viscosity was measured and recorded as "initial viscosity after preparation"

The slurry composition was split into two separate containers for the long term stability testing One container was kept at ambient temperature, and the other container was stored in an oven at 40° C.

The viscosity was measured after 24 hrs, 1 week, 2 weeks, 3 weeks and 4 weeks after day of preparation.

After 4 weeks at 40° C., the physical stability was measured and recorded according to phase separation, if any.

Pumpability and Physical Stability Characterization Procedure

The pumpability and stability of the slurry compositions were characterized by viscosity measurements and phase separation measurements of the slurry suspensions.

I. Viscosity Measurement:

Brookfield viscosity measurements were taken at ambient temperature using, in most cases, Lv3 or Lv4 spindle at 30 rpm.

Viscosity measurements were taken after gently mixing the slurry and allowing the spindle to equilibrate in the slurry mixture for 3 minutes.

Viscosity was recorded at regular stability intervals

Slurry compositions with viscosity measurements of <5,000 cP were deemed "pumpable"

II. Physical Stability:

Slurries were visually inspected to determine if any phase separation of the oil occurred or if any solids had settled.

Slurries were termed "fluid" if free-flowing or "gel" if they were non-flowing suspensions.

Phase separation of mineral oil from the slurry composition was characterized by the vol. % separated, calculated by dividing the thickness of separation measured by a ruler in "mm" by the total height of the mixture and multiplying the value by 100.

The amount of solids settled in the slurry was calculated by a "pour out test".

The slurry sample container was weighted and inverted into a collection beaker for a total of 60 seconds.

The mass of the emptied slurry container in 60 sec was subtracted from the initial weight to determine the amount of non-settled slurry, which was indirectly used to determine the weight of the settled solids in the slurry.

Slurry compositions were subject to freezing then thawing, and once thawed, the viscosity was measured and recorded.

Slurry compositions were deemed "stable" when:

(i) remaining pumpable after being aged for 4 weeks at ambient temperature;

(ii) remaining pumpable after being aged for 4 weeks at 40° C.;

(iii) having a phase separation of less than 5 wt. % settled solids and/or less than 5 vol. % oil phase separation, when aged for 4 weeks at 40° C.; and (iv) remaining pumpable after being subject to 3 freeze/thaw cycles.

Materials

The following chemicals were used to prepare the Examples or Comparative Examples below, according to their category:

Solvent (A): EFC CRYSTAL 250 (an ultra-purified mineral oil in the $C_{15}$-$C_{20}$ range having an ultralow BTEX content, available from Total); LPA-210 (a refined (hydrotreated) petroleum distillate, of isoparafins and naphthenics with a very low polycyclic aromatics and BTEX content, available from Sasol); CONOSOL C-200 (an aliphatic solvent composed primarily of $C_{12}$-$C_{16}$ naphthenic and isoparaffinic hydrocarbons, available from Calumet Lubricants); HF 1000 (a BTEX free synthetic blend of paraffins, olefins, and oxygenates, available from Sasol); and BIO-BASE 628 (a synthetic blend with a low aromatic content, available from Shrieve).

Suspension aid (B): CLAYTONE II and CLAYTONE AF (each organophilic bentonites, available from BYK); TIXO-GEL MP 100 (an organically modified montmorillonite, available from BYK).

Polar activator (C): JEFFSOL propylene carbonate (PC) (available from Huntsman); water; methanol.

Stabilizer/surfactant (D): AMIET 505 (an ethoxylated fatty monoamine); DIAMIET 505 (an ethoxylated fatty diamine); DIAMIET 515 (an ethoxylated fatty diamine); EMULGEN 4204 (an alcohol ethoxylate); FARMIN T (a tallow amine); DIAMIN T (N-tallow alkyltrimethylenediamine), each available from Kao Corporation; and SPAN 80 (a sorbitan monooleate, available from Sigma Aldrich).

Organic polymers (E1): FR-1 (an anionic polyacrylamide finely ground with a PSD<200 µm and a high weight average molecular weight of >20,000,000 MW, suitable for use in complex brines up to 250,000 mg/L TDS, produced in the USA); FR-2 (an anionic polyacrylamide finely ground with a PSD of <200 µm and a high weight average molecular weight of >20,000,000 MW, suitable for use in freshwater to light brines up to 100,000 mg/L TDS, produced in the USA); FR-3 (an anionic polyacrylamide finely ground with a PSD of <200 µm and medium-high weight average molecular weight of >10,000,000-20,000,000 MW, suitable for use in fresh water, manufactured in China); Guar gum (available from Altrafine gums, Gujarat, India); NATROSOL 250 LR (a non-ionic, water-soluble, low molecular weight hydroxyethyl cellulose surface-treated with glyoxal) and NATROSOL 250 MBR (a non-ionic, water-soluble, medium molecular weight hydroxyethyl cellulose surface-treated with glyoxal), each available from Ashland; AQUALON CMC 9H7F (a sodium carboxymethyl cellulose having a medium D.S. and a high viscosity, available from Ashland); CULMINAL MHEC 6000 PR (a water-soluble, non-ionic, methyl hydroxyethyl cellulose with retarded solubility and a Brookfield viscosity as a 2 wt. % solution of 6,000-8,000 cP, available from Ashland); FLOWZAN BIOPOLYMER (a high purity xanthan gum available from Chevron Phillips Chemical Company, LP).

Inorganic materials (E2): TI-PURE R-960 (a ground rutile $TiO_2$ available from Chemours); IMERFILL 25 (a ground white marble, $CaCO_3$, with a median particle size of 25 µm, available from Imerys); ulexite (available from American Borate Company).

Various slurry compositions were prepared by varying the type of solvent (A), suspension aid (B), stabilizer/surfactant (D), active ingredient (E), as well as the use of chemical activation (e.g., polar activators (C)) versus heat activation. The active ingredients (E) tested were categorized as either organic polymers (E1), for example, organic polymers derived from natural polymers, such as guar gum and xanthan gum, chemically modified natural polymers, such as cellulose ethers, and synthetic polymers such as polyacrylamide and polyacrylate friction reducers; or inorganic materials (E2) such as $TiO_2$, $CaCO_3$ and ulexite. Within the slurry composition, these active ingredients retained their solid phase, and the slurry compositions can thus be understood to be a payload of suspended solids. Table 1 is a general summary of typical slurry compositions tested.

TABLE 1

| Typical slurry compositions | | |
|---|---|---|
| Compound | Concentration (wt. %) | Concentration (wt. %) |
| Solvent (A) | 35-67 | 35-40 |
| Suspension Aid (B) | 1.70-3.10 | 0.5-2.5 |
| Polar Activator (C) | 0.15-0.90 | 0.40-0.8 |
| Stabilizer (D) | 0.65-3.10 | 0.5-2.5 |
| Organic Polymer (E1) | 26-60 | — |
| Inorganic Materials (E2) | — | 50-60 |

Example 1

To determine whether pumpable/stable high solids slurry compositions could be realized, several slurries were prepared with EFC CRYSTAL 250 mineral oil, CLAYTONE AF organophilic clay, JEFFSOL PC polar activator, and 60 wt. % FR-2 dry polyacrylamide friction reducer, while varying the stabilizer/surfactant type. As can be seen in Table 2A, it was unexpectedly discovered that the use of alkoxylated fatty amines (Example 1A prepared with AMIET 505, an ethoxylated fatty monoamine) provided pumpable and stable slurry compositions at this high solids loading, whereas other stabilizer types, including ethoxylated alcohols (Comparative Example 1 prepared with EMULGEN 4204) and sorbitan fatty esters (Comparative Example 2 prepared with SPAN 80) provided slurries with unacceptable stability in terms of phase separation/solid settlement.

Further investigation revealed the superior results obtained with alkoxylated fatty amines (Example 1) compared to fatty amine variants (Comparative Example 3 prepared with FARMIN T and Comparative Example 4 prepared with DIAMIN T), the fatty amines quickly leading to gel formation after 24 hours with non-pumpable viscosities (Table 2B).

All percentages listed below are in terms of weight percent unless indicated otherwise.

TABLE 2A

| Impact of surfactant on slurry composition stability. | | | |
|---|---|---|---|
| Compound | Example 1 | Comparative Example 1 | Comparative Example 2 |
| EFC CRYSTAL | 35.38% | 35.38% | 35.38% |
| CLAYTONE AF | 2.00% | 2.00% | 2.00% |
| JEFFSOL PC | 0.62% | 0.62% | 0.62% |
| AMIET 505 | 2.00% | — | — |
| EMULGEN 4204 | — | 2.00% | — |
| SPAN 60 | — | — | 2.00% |
| FR-2 | 60.00% | 60.00% | 60.00% |

TABLE 2A-continued

Impact of surfactant on slurry composition stability.

| | Stability Data | | | | | | | | |
|---|---|---|---|---|---|---|---|---|---|
| Stability Conditions | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C*, cPs | Phase separation after storage @ 40° C, Wt. % |
| Initial viscosity (After preparation) | 1784 | — | — | 1416 | — | — | 2068 | — | — |
| 24 hours After Preparation | 1748 | 2116 | 0% | 1440 | 1084 | 0% | 2276 | 2000 | 0% |
| Week 1 | 1828 | 2008 | 0% | — | — | — | — | — | — |
| Week 2 | 1756 | 2364 | 0% | 1392 | 1828 | 2% | 1784 | 2582 | 2% |
| Week 3 | 1700 | 2523 | — | — | — | — | — | — | — |
| Week 4 | 1800 | 2951 | 0% | 1580 | 2046 | 5% | 2220 | 2842 | 6% |
| Week 4 Observation | Stable Suspension with No Separation/No Settlement | | | Unstable Suspension with Phase Separation/Solid Settlement | | | Unstable Suspension with Phase Separation/Solid Settlement | | |

*Brookfield viscosity with Spindles 3 or 4 and 30 rpm

TABLE 2B

Comparison of ethoxylated fatty amines and fatty amines

| Compound | Example 1 | Comparative Example 3 | Comparative Example 4 |
|---|---|---|---|
| EFC CRYSTAL 250 | 35.38% | 35.38% | 35.38% |
| CLAYTONE AF | 2.00% | 2.00% | 2.00% |
| JEFFSOL PC | 0.62% | 0.62% | 0.62% |
| AMIET 685 | 2.00% | — | — |
| FARMIN T | — | 2.00% | — |
| DIAMIN T | — | — | 2.00% |
| FR-2 | 60.00% | 60.00% | 60.00% |

| | Stability Data | | | | | | | | |
|---|---|---|---|---|---|---|---|---|---|
| Stability Conditions | Viscosity @ Ambient temp.*, cPs | Viscosity @ 40° C., cPs | Phase separation after storage @ 40° C, Wt. % | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C*, cPs | Phase separation after storage @ 40° C*, Wt. % |
| Initial viscosity (After preparation) | 1784 | — | — | 1648 | — | — | 1720 | — | — |
| 24 hours After Preparation | 1748 | 2116 | 8% | >5000 | >5000 | 2% | >5000 | >5000 | 1% |
| 24 h Observation | Stable Suspension with No Separation/No Settlement | | | Unstable Suspension with Phase Separation/Gel Formation | | | Unstable Suspension with Phase Separation/Gel Formation | | |

*Brookfield viscosity with Spindles 3 or 4 and 30 rpm

With a viable stabilizer/surfactant type in hand, several high solids slurry compositions were prepared using a specific mineral oil solvent (EFC CRYSTAL 250), while varying the suspension aids (CLAYTONE II, CLAYTONE AF and TIXOGEL MP 100 organophilic clays), polar activators (JEFFSOL PC, methanol, and water), and stabilizer/surfactant (ethoxylated fatty monoamine—AMIET 505; ethoxylated fatty diamine—DIAMIET 505 and DIAMIET 515). It was possible to produce up to 60 wt. % solid suspensions with various active ingredients, including both organic polymers (xanthan gum, polyacrylamide friction reducers, guar gum, carboxymethyl cellulose, hydroxyethyl cellulose, methyl hydroxyethyl cellulose), and inorganic materials ($CaCO_3$, $TiO_2$ and ulexite). The resulting high solids slurry compositions were easily flowable (viscosity<5,000 cPs) and stable for over several weeks. Stability was judged by viscosity stability over time, and physical stability (phase separation, solids settlement) under ambient temperature and 40° C.

TABLE 2C

Overview of several slurry composition Examples

| Compounds | Chemical | Trade name | Concentration, Wt. % | | | | | | |
|---|---|---|---|---|---|---|---|---|---|
| | | | Ex. 1 | Ex. 6A | Ex. 2A | Ex. 9 | Ex. 7A | Ex. 7B | Ex. 8D |
| Solvent (A) | Mineral Oil | EFC CRYSTAL 250 | 35.38 | 36.11 | 35.38 | 44.2 | 45.32 | 43.89 | 55.43 |
| Suspension Aid (B) | Organophilic Clay | CLAYTONE AF | 2 | 1.73 | — | 2.5 | 2 | — | 2.52 |
| | | CLAYTONE II | — | — | 2 | — | — | 3.09 | — |
| | | TIXOGEL MP 100 | — | — | — | — | — | — | — |
| Polar activator (C) | Propylene Carbonate | JEFFSOL PC | 0.62 | — | 0.62 | 0.8 | 0.67 | 0.82 | 0.84 |
| | Methanol/water (95/5 v/v) | — | — | 0.57 | — | — | — | — | — |
| Stabilizer (D) | Ethoxylated Fatty Monoamine | AMIET 505 | 2 | 2.59 | 2 | 2.5 | 2 | 3.09 | — |
| | Ethoxylated Fatty Diamine | DIAMIET 505 | — | — | — | — | — | — | 0.89 |
| | | DIAMIET 515 | — | — | — | — | — | — | — |
| Organic Polymer (E1) | Polyacrylaminde | FR-1 or FR-2 | 60$^a$ | 59$^b$ | 60$^a$ | — | — | — | — |
| | Xanthan gum | FLOWZAN BIOPOLYMER | — | — | — | 50 | — | — | — |
| | Guar gum | — | — | — | — | — | 50.01 | 49.11 | — |
| | HEC | NATROSOL 250 MBR | — | — | — | — | — | — | 40.32 |
| | | NATROSOL 250 LR | — | — | — | — | — | — | — |
| | CMC | AQUALON CMC 9H7F | — | — | — | — | — | — | — |
| | MHEC | CULMINAL MHEC 6000 PR | — | — | — | — | — | — | — |
| Inorganic material (E2) | CaCO$_3$ | IMERFILL 25 | — | — | — | — | — | — | — |
| | TiO$_2$ | TI-PURE R-960 | — | — | — | — | — | — | — |
| | Ulexite | — | — | — | — | — | — | — | — |
| Total | | | 100 | 100 | 100 | 100 | 100 | 100 | 100 |

| Compounds | Chemical | Trade name | Concentration, Wt. % | | | | | | |
|---|---|---|---|---|---|---|---|---|---|
| | | | Ex. 8E | Ex. 8A | Ex. 8B | Ex. 8C | Ex. 10B | Ex. 10A | Ex. 10C |
| Solvent (A) | Mineral Oil | EFC CRYSTAL 250 | 55.43 | 48.65 | 44.2 | 86.34 | 35.38 | 35.38 | 48.84 |
| Suspension Aid (B) | Organophilic Clay | CLAYTONE AF | 2.52 | 2.75 | 2.5 | 2.09 | 2 | 2 | 0.5 |
| | | CLAYTONE II | — | — | — | — | — | — | — |
| | | TIXOGEL MP 100 | — | — | — | — | — | — | — |
| Polar activator (C) | Propylene Carbonate | JEFFSOL PC | 0.84 | 0.85 | 0.8 | 0.7 | 0.62 | 0.62 | 0.16 |
| | Methanol/water (95/5 v/v) | — | — | — | — | — | — | — | — |
| Stabilizer (D) | Ethoxylated Fatty Monoamine | AMIET 505 | — | 2.75 | 2.5 | 0.84 | 2 | 2 | 0.5 |
| | Ethoxylated Fatty Diamine | DIAMIET 505 | — | — | — | — | — | — | — |
| | | DIAMIET 515 | 0.89 | — | — | — | — | — | — |

TABLE 2C-continued

Overview of several slurry composition Examples

| | | | | | | | | | |
|---|---|---|---|---|---|---|---|---|---|
| Organic Polymer (E1) | Polyacrylaminde | FR-1 or FR-2 | — | — | — | — | — | — | — |
| | Xanthan gum | FLOWZAN BIOPOLYMER | — | — | — | — | — | — | — |
| | Guar gum | — | — | — | — | — | — | — | — |
| | HEC | NATROSOL 250 MBR | 40.32 | — | — | — | — | — | — |
| | | NATROSOL 250 LR | — | 45 | — | — | — | — | — |
| | CMC | AQUALON CMC 9H7F | — | — | 50 | — | — | — | — |
| | MHEC | CULMINAL MHEC 6000 PR | — | — | — | 30.03 | — | — | — |
| Inorganic material (E2) | CaCO$_3$ | IMERFILL 25 | — | — | — | — | 60 | — | — |
| | TiO$_2$ | TI-PURE R-960 | — | — | — | — | — | 60 | — |
| | Ulexite | — | — | — | — | — | — | — | 50 |
| Total | | | 100 | 100 | 100 | 100 | 100 | 100 | 100 |

[a]FR-2;
[b]FR-1

Example 2

Slurry compositions of Examples 1 and 2A were prepared with EFC CRYSTAL 250 mineral oil, JEFFSOL propylene carbonate polar activator, ethoxylated fatty amine (AMIET 505), dry polyacrylamide friction reducer FR-2, while varying two different organophilics clays (CLAYTONE AF and CLAYTONE II). The data in Table 3 show that stable, low viscosity and high solids (60 wt. % dry friction reducer) slurry compositions were produced, i.e., the suspensions had relatively stable viscosity over 4 weeks under either ambient conditions or 40° C., and no phase separation was experienced after 4 weeks at 40° C. (Table 3).

TABLE 3

Impact of organophilic clay on slurry stability

| Compound | Example 1 | Example 2A |
|---|---|---|
| EFC CRYSTAL 250 | 35.38% | 35.38% |
| CLAYTONE AF | 2.00% | — |
| CLAYTONE II | — | 2.00% |
| JEFFSOL PC | 0.62% | 0.62% |
| AMIET 505 | 2.00% | 2.00% |
| FR-2 Friction reducer | 60.00% | 60.00% |

Stability Data

| Stability Conditions | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C*, cPs | Phase separation after storage @ 40° C, Wt. % |
|---|---|---|---|---|---|---|
| Initial viscosity (After preparation) | 1784 | | — | 1264 | | — |
| 24 hours After Preparation | 1748 | 2116 | 0 | 1348 | 1716 | 0% |
| Week 1 | 1828 | 2008 | 0 | 1448 | 2112 | 0% |
| Week 2 | 1756 | 2364 | 0% | 1400 | 2072 | 0% |
| Week 3 | 1700 | 2523 | — | 1388 | 2431 | — |
| Week 4 | 1800 | 2951 | 0% | 1412 | 2804 | 0% |

*Brookfield viscosity with Spindles 3 or 4 and 30 rpm

The data in Table 4 shows that it is possible to lower the slurry viscosity by reducing the total polymer content (Example 2B), but the physical stability is reduced. The resulting low-polymer slurry passes the initially set separation specification (<5% after 2 weeks).

TABLE 4

Impact of friction reducer concentration on slurry stability

| Compound | Example 1 | Example 2B |
| --- | --- | --- |
| EFC CRYSTAL 250 | 35.38% | 39.96% |
| CLAYTONE AF | 2.00% | 2.18% |
| JEFFSOL PC | 0.62% | 0.68% |
| AMIET 505 | 2.00% | 2.18% |
| FR-2 Friction reducer | 60.00% | 55.00% |

Stability Date

| Stability Conditions | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C.*, cPs | Phase separation after storage @ 40° C, Wt. % |
| --- | --- | --- | --- | --- | --- | --- |
| Initial viscosity (After preparation) | 1784 | — | — | 1364 | — | — |
| 24 hours After Preparation | 1746 | 2116 | 0% | 1360 | 1144 | 0% |
| Week 1 | 1828 | 2008 | 0% | 1282 | 1128 | 3% |
| Week 2 | 1756 | 2364 | 0% | 1244 | 1136 | 4% |
| Week 3 | 1700 | 2523 | — | 1340 | 1208 | — |
| Week 4 | 1800 | 2951 | 0% | 1356 | 1160 | 6% |

Example 3

Examples 3A and 3B were each prepared with different mineral oils (either LPA-210 or CONOSOL C-200), but otherwise with the same composition (CLAYTONE AF, JEFFSOL PC, AMIET 505, and FR-2) using the standard preparation process. The data in Table 5 shows that the samples had nearly identical initial viscosity that remained in same order of magnitude after four weeks at both ambient temperature and 40° C. The slurries also had an excellent physical stability, with about 1% phase separation after four weeks at 40° C.

TABLE 5

Impact of mineral oil on slurry stability

| Compound | Example 3A | Example 3B |
| --- | --- | --- |
| LPA-210 | 36.13% | — |
| CONOSOL C-200 | — | 36.16% |
| CLAYTONE AF | 2.04% | 2.04% |
| JEFFSOL PC | 0.68% | 0.68% |
| AMIET 505 | 2.04% | 2.04% |
| FR-2 Friction reducer | 59.12% | 59.08% |

Stability Data

| Stability Conditions | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C.*, cPs | Phase separation after storage @ 40° C, Wt. % |
| --- | --- | --- | --- | --- | --- | --- |
| Initial viscosity (After preparation) | 852 | — | — | 866 | — | — |

TABLE 5-continued

| Impact of mineral oil on slurry stability | | | | | | |
|---|---|---|---|---|---|---|
| 24 hours After Preparation | 924 | 968 | 0% | 875 | 943 | 0% |
| Week 1 | 903 | 1108 | 0% | 843 | 1100 | 0% |
| Week 2 | 1092 | 1168 | 1% | 925 | 1116 | 1% |
| Week 3 | 983 | 1264 | — | 1260 | 1250 | — |
| Week 4 | 983 | 1326 | 1% | 1082 | 1260 | 1% |

*Brookfield viscosity with Spindles 3 or 4 and 30 rpm

Example 4

Examples 4A to 4D were prepared with blends of mineral oils to study the compatibility of the different oils and their impact on the slurry composition stability. The mineral oils evaluated were EFC CRYSTAL 250, LPA-210, CONOSOL C-200, HF1000, and BIO-BASE 628. Each slurry composition was prepared with CLAYTONE AF, JEFFSOL PC, AMIET 505, and FR-2. The data in Table 6 shows that the different oil solvents produce slurry compositions with similar target viscosity after preparation (<1,500 cP) with the exception of BIO-BASE 628 which produced a very low viscosity slurry. While the storage viscosity at ambient temperature remained almost unchanged, storage at 40° C. did induce an increase in viscosity over time, particularly with LPA-210 and CONOSOL C-200. The slurry stability remained within the target specification with 3% phase separation after 4 weeks storage at 40° C.

TABLE 6

| Impact of mineral oil blends on slurry stability | | | | |
|---|---|---|---|---|
| Compound | Example 4A | Example 4B | Example 4C | Example 4D |
| EFC CRYSTAL 250 | 15.38% | 15.38% | 15.38% | 15.38% |
| LPA-210 | 20.00% | — | — | — |
| CONOSOL C-200 | — | 20.00% | — | — |
| HF 1000 | — | — | 20.00% | — |
| BIO-BASE 626 | — | — | — | 20.00% |
| CLAYTONE AF | 2.00% | 2.00% | 2.00% | 2.00% |
| JEFFSOL PC | 0.62% | 0.62% | 0.62% | 0.62% |
| AMIET 505 | 2.00% | 2.00% | 2.00% | 2.00% |
| FR-2 Friction reducer | 60.00% | 60.00% | 60.00% | 60.00% |

| Stability Data | | | | | | |
|---|---|---|---|---|---|---|
| Stability Conditions | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C*, cPs | Phase separation after storage @ 40° C, Wt. % |
| Initial viscosity (After preparation) | 1384 | — | — | 1392 | — | — |
| 24 hours After Preparation | 1336 | 1500 | 0% | 1264 | 1424 | 0% |
| Week 1 | 1340 | 1984 | 0% | 1212 | 1836 | 1% |
| Week 2 | 1308 | 2244 | 1% | 1220 | 1980 | 1% |
| Week 3 | 1404 | 4382 | — | 1248 | 2874 | — |
| Week 4 | 1404 | 6839 | 2% | 1264 | 4779 | 2% |

| Stability Data | | | | | | |
|---|---|---|---|---|---|---|
| Stability Conditions | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C*, cPs | Phase separation after storage @ 40° C, Wt. % |
| Initial viscosity (After preparation) | 1332 | — | — | 904 | — | — |
| 24 hours After Preparation | 1256 | 1172 | 0% | 912 | 1152 | 0% |

TABLE 6-continued

| Impact of mineral oil blends on slurry stability | | | | | |
|---|---|---|---|---|---|
| Week 1 | 1176 | 1488 | 1% | 856 | 1168 | 0% |
| Week 2 | 1148 | 1616 | 2% | 820 | 1368 | 2% |
| Week 3 | 1174 | 1988 | — | 816 | 1586 | — |
| Week 4 | 1220 | 2383 | 3% | 824 | 2016 | 3% |

*Brookfield viscosity with Spindles 3 or 4 and 30 rpm

Example 5

Examples 1 and 5A were prepared to study the impact of the friction reducer on the stability of the slurry composition. The slurry compositions differ by the friction reducer. Table 7 shows that slurry compositions made with friction reducer FR-2 had excellent long term stability in terms of viscosity and physical stability over four weeks at both ambient temperature and 40° C. Under the same conditions, the slurries made with friction reducer FR-1 start to gel after one week of storage at 40° C.

Examples 2A and 5B show that despite replacing CLAY-TONE AF organophilic clay with CLAYTONE II, the same outcome is observed. The slurry viscosities were lower with CLAYTONE II, but the gelation phenomenon is still experienced with friction reducer FR-1 at 40° C. storage.

The data in Table 7 show that slurry compositions prepared using FR-1 failed to pass the long term stability specifications at 40° C.

TABLE 7

Impact of friction reducer on slurry stability

| Compound | Example 1 | Example 5A | Example 2A | Example 5B |
|---|---|---|---|---|
| EFC CRYSTAL 250 | 35.38% | 35.36% | 35.38% | 35.36% |
| CLAYTONE AF | 2.00% | 2.00% | — | — |
| CLAYTONE II | — | — | 2.00% | 2.00% |
| JEFFSOL PC | 0.62% | 0.62% | 0.62% | 0.62% |
| AMIET 505 | 2.00% | 2.00% | 2.00% | 2.00% |
| FR-2 Friction reducer | 60.00% | — | 60.00% | — |
| FR-1 Friction reducer | — | 60.00% | — | 60.00% |

Stabililty Data

| Stability Conditions | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C, cPs | Phase separation after storage @ 40° C, Wt. % | Viscosity @ Ambient temp.*, cPs | Viscosity @ 40°C*, cPs | Phase separation after storage @ 40° C, Wt. % | Viscosity @ Ambient temp.*, cPs | Viscosity @ 40°C*, cPs | Phase separation after storage @ 40° C, Wt. % |
|---|---|---|---|---|---|---|---|---|---|---|---|---|
| Initial viscosity (After preparation) | 1784 | | | 1960 | | | 1264 | | | 1188 | | |
| 24 hours After Preparation | 1748 | 2116 | 0% | 1968 | 2351 | 0% | 1348 | 1716 | 0% | 1298 | 1676 | 0% |
| Week 1 | 1828 | 2008 | 0% | 2072 | 6894 | 0% | 1448 | 2112 | 0% | 1332 | 2859 | 0% |
| Week 2 | 1756 | 2364 | 0% | 2072 | 10001 | 0% | 1400 | 2072 | 0% | 1400 | 4686 | 0% |
| Week 3 | 1700 | 2523 | — | 2292 | 10002 | — | 1388 | 2431 | — | 1652 | 10000 | — |
| Week 4 | 1800 | 2951 | 0% | 2563 | 10003 | 0% | 1412 | 2804 | 0% | 1672 | 10000 | 0% |

*Brookfield viscosity with Spindles 3 or 4 and 30 rpm

Example 6

The impact of activation strategy (use of polar activators or heat treatment) on the stability of slurry compositions was also studied. Example 5A, made with FR-1 friction reducer that failed the long term stability under high temperature conditions was used as a reference. The slurry Example 5A was made with propylene carbonate as a polar activator. Table 8 shows that replacing propylene carbonate with methanol/water (95/5) as polar activator (Example 6A), produced a very stable slurry with FR-1 friction reducer. The resulting slurry had excellent stability with a viscosity almost unchanged over four weeks storage at both ambient temperature and 40° C. Furthermore, to overcome the viscosity buildup of Example 5A, "heat treatment" (applied heat of 40-45° C.) was also tested as a clay activation strategy in lieu of chemical activation with polar activators. Slurry of Example 6B showed excellent long term viscosity stability.

TABLE 8

Impact of polar activator or heat treatment on slurry stability

| Compound | Example 5A (Chemical activation) | Example 6A (Chemical activation) | Example 6B (Heat activation) |
| --- | --- | --- | --- |
| EFC CRYSTAL | 35.38% | 36.11% | 41.21% |
| CLAYTONE AF | 2.00% | 1.73% | 2.03% |
| JEFFSOL PC | 0.52% | — | — |
| 98/5 v/v methanol/water | — | 0.57% | — |
| AMIET 505 | 2.00% | 2.59% | 2.03% |
| FR-1 Friction | 60.00% | 58.99% | 54.73% |

Stability Data

| Stability Conditions | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C*, cPs | Phase separation after storage @ 40° C, Wt. % |
| --- | --- | --- | --- | --- | --- | --- | --- | --- | --- |
| Initial viscosity (After preparation) | 1960 | — | | 1884 | — | | 1436 | | |
| 24 hours After Preparation | 1968 | 2351 | 0% | 1728 | 2060 | 0% | — | 1.432 | 0% |
| Week 1 | 2072 | 6894 | 0% | 1798 | 2332 | 0% | — | 1.560 | 0% |
| Week 2 | 2072 | 10001 | 0% | 1856 | 2184 | 0% | — | 1.574 | 0% |
| Week 3 | 2292 | 10002 | — | 1892 | 1990 | 0 | — | 1.646 | — |
| Week 4 | 2563 | 10003 | 0% | 1878 | 2056 | 0% | — | 1.592 | 6% |

*Brookfield viscosity with Spindles 3 or 4 and 30 rpm

Example 7

Slurries compositions were also made at about 50 wt. % loading of guar gum, and long term stability was evaluated with two different suspension aids. Table 9 shows that although used at a higher concentration, CLAYTONE II (Example 7B) provides lower initial viscosity compared to CLAYTONE AF (Example 7A). The physical stability over four weeks at 40° C. is also much better with CLAYTONE II. The increased amount of AMIET 505 is apparently helping to reduce the overall slurry viscosity, despite the increase in suspension aid content (Example 7B).

TABLE 9

Impact of organophilic clay on high solids guar gum slurries

| Compound | Example 7A | Example 7B |
| --- | --- | --- |
| EFC CRYSTAL 250 | 45.32% | 43.89% |
| CLAYTONE AF | 2.00% | — |
| CLAYTONE II | — | 3.09% |
| JEFFSOL PC | 0.67% | 0.82% |
| AMIET 505 | 2.00% | 3.09% |
| Guar gum | 50.01% | 49.11% |

Stability Data

| Stability Conditions | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C*, cPs | Phase separation after storage @ 40° C, Wt. % |
| --- | --- | --- | --- | --- | --- | --- |
| Initial viscosity (After preparation) | 2324 | — | | 1596 | | |
| 24 hours After Preparation | 2224 | 2470 | 0% | 1488 | 2088 | 0% |
| Week 1 | 2671 | 2976 | 2% | 1452 | 2723 | 0% |
| Week 2 | 2459 | 3408 | 3% | 1712 | 3871 | 0% |

TABLE 9-continued

Impact of organophilic clay on high solids guar gum slurries

| Week 3 | 2280 | 3842 | — | 1692 | 3727 | — |
| Week 4 | 2384 | 3922 | 3% | 1772 | 4082 | 0% |

*Brookfield viscosity with Spindles 3 or 4 and 30 rpm

Example 8

To demonstrate the broad functionalities that can be slurried using ethoxylated fatty amines (e.g., AMIET 505), slurry compositions were prepared using various cellulose ethers such as hydroxyethyl cellulose (NATROSOL 250 LR) (Example 8A) and carboxymethyl cellulose (AQUALON CMC 9H7F) (Example 8B) as shown in Table 10A. The data in Table 10A shows that it is possible to make low viscosity and stable slurries up to 50 wt. % concentration. Example 8B had extremely low viscosity for such a high loading, and the viscosity remains constant over time for four weeks at ambient temperature and 40° C. The physical stability remains good for both slurries (Examples 8A and 8B).

TABLE 10A

Long term stability of high solids cellulose ether slurries

| Compound | Example 8A | Example 8B |
|---|---|---|
| EFC CRYSTAL 250 | 48.65% | 44.20% |
| CLAYTONE AF | 2.75% | 2.50% |
| JEFFSOL PC | 0.85% | 0.78% |
| AMIET 505 | 2.75% | 2.50% |
| NATROSOL 250 LR | 45.00% | — |
| AQUALON CMC 9H7F | — | 50.00% |

Stability Data

| Stability Conditions | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C*, cPs | Phase separation after storage @ 40° C, Wt. % |
|---|---|---|---|---|---|---|
| Initial viscosity (After preparation) | 1240 | — | — | 499 | — | — |
| 24 hours After Preparation | 972 | 947 | 0% | 604 | 479 | 0% |
| Week 1 | 1132 | 1192 | 0% | 542 | 532 | 0% |
| Week 2 | 1196 | 1272 | 1% | 556 | 520 | 0% |
| Week 3 | 1236 | 1544 | — | 480 | 532 | — |
| Week 4 | 1172 | 1624 | 2% | 468 | 456 | 0% |

*Brookfield viscosity with Spindles 3 or 4 and 30 rpm

Methyl hydroxyethyl cellulose (CULMINAL MHEC 6000 PR) was also evaluated in the slurry compositions (Example 8C, Table 10B), using CLAYTONE AF suspension aid, propylene carbonate polar activator, and ethoxylated fatty monoamine (AMIET 505) stabilizer. The polymer concentration in Example 8C was limited to about 30 wt. %, due to open grain morphology and low density of the MHEC polymer. Regardless, the slurry composition was pumpable and stable for four weeks at ambient temperature.

TABLE 10B

Long term stability of high solids cellulose ether slurries

| Compound | Example 8C |
|---|---|
| EFC CRYSTAL 250 | 66.34% |
| CLAYTONE AF | 2.09% |
| JEFFSOL PC | 0.70% |
| AMIET 505 | 0.84% |
| CULMINAL MHEC 6000 PR | 30.03% |

Stability Data

| Stability Conditions | Viscosity @ Ambient temp.*, cPs | Phase separation after storage @ Amb. Temp, Wt. % |
|---|---|---|
| Initial viscosity (After preparation) | 1368 | — |
| Week 4 | 1458 | 1% |

*Brookfield viscosity with Spindles 3 or 4 and 30 rpm

Along with previous examples, Examples 8D to 8F highlight the efficiency of ethoxylated fatty amines to formulate low viscosity and stable polymer slurries. As shown in Table 10C, ethoxylated fatty monoamines (AMIET 505) and ethoxylated fatty diamines with different ethoxylation levels (DIAMIET 505 and DIAMIET 515) produced low viscosity hydroxyethyl cellulose suspensions.

TABLE 10C

Long term stability of high solids cellulose ether slurries

| Compound | Example 8D | Example 8E | Example 8F |
|---|---|---|---|
| EFC CRYSTAL 250 | 55.43% | 55.43% | 55.43% |
| CLAYTONE AF | 2.52% | 2.52% | 2.52% |
| JEFFSOL PC | 0.84% | 0.84% | 0.84% |
| DIAMIET 505 | 0.89% | — | — |
| DIAMIET 515 | — | 0.89% | — |
| AMIET 505 | — | — | 0.89% |
| NATROSOL 250 MBR | 40.32% | 40.32% | 40.32% |

TABLE 10C-continued

Long term stability of high solids cellulose ether slurries

| Compound | Example 8D | Example 8E | Example 8F |
|---|---|---|---|
| Initial viscosity (After preparation), cPs | 321 | 260 | 440 |

*Brookfield viscosity with Spindles 3 or 4 and 30 rpm

Example 9

Example 9 was prepared as a high solids suspension with a biopolymer, i.e., xanthan gum (FLOWXAN BIOPOLYMER). Table 11 shows that the long term stability was excellent, with only minor viscosity variation after four weeks at both ambient temperature and 40° C. No phase separation was measured under high temperature storage.

TABLE 11

Long term stability of high solids xanthan gum slurry

| Compound | Example 9 |
|---|---|
| EFC CRYSTAL 250 | 44.20% |
| CLAYTONE AF | 2.50% |
| JEFFSOL PC | 0.78% |
| AMIET 505 | 2.50% |
| FLOWZAN BIOPOLYMER | 50.00% |

Stability Data

| Stability Conditions | Viscosity @ Ambient temp.*, cPs | Viscosity @ 48° C.*, cPs | Phase separation after storage @ 48° C., Wt. % |
|---|---|---|---|
| Initial viscosity (After preparation) | 903 | | — |
| 24 hours After | 1340 | 1900 | 0% |
| Week 1 | 1304 | 2188 | 0% |
| Week 2 | 1694 | 2248 | 0% |
| Week 3 | 2122 | 2144 | — |
| Week 4 | 2148 | 2375 | 0% |

*Brookfield viscosity with Spindles 3 or 4 and 30 rpm

Example 10

Examples 10A to 10C illustrate high solids slurry compositions formulated with inorganic material active ingredients, i.e., $TiO_2$ (Example 10A), $CaCO_3$ (Example 10B), and ulexite (Example 10C). Table 12 shows excellent slurry stabilities over four weeks storage at both ambient temperature and 40° C. The $TiO_2$ slurry (TI-PURE R-960, Example 10A) looked to be thixotropic but the $CaCO_3$ slurry (IMERFILL 25, Example 10B) had an extremely low viscosity while exhibiting stable viscosity over time, with insignificant phase separation after four weeks at 40° C. The ulexite slurry (Example 10C) did show some phase separation and settlement when stored at 40° C., but the viscosity remained within the acceptable range.

TABLE 12

Long term stability of high solids inorganic material slurries

| Compound | Example 10A | Example 10B | Example 10C |
|---|---|---|---|
| EFC CRYSTAL 250 | 35.38% | 35.38% | 48.84% |
| CLAYTONE AF | 2.00% | 2.00% | 0.50% |
| JEFFSOL PC | 0.62% | 0.62% | 0.16% |
| AMIET 505 | 2.00% | 2.00% | 0.50% |

TABLE 12-continued

Long term stability of high solids inorganic material slurries

| | | | |
|---|---|---|---|
| TI-PURE R-960 TiO$_2$ | 60.00% | — | — |
| IMERFILL 25 CaCO$_3$ | — | 60.00% | — |
| Ulexite | — | — | 50.00% |

Stability Data

| Stability Conditions | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C*, cPs | Phase separation after storage @ 40° C, Wt. % | Viscosity @ Ambient temp.*, cPs | Viscosity @ 40° C*, cPs | Phase separation after storage @ 40° C, Wt. % |
|---|---|---|---|---|---|---|---|---|---|
| Initial viscosity (After preparation) | 2242 | — | — | 224 | — | — | 975 | — | — |
| 24 hours After Preparation | 2663 | 2542 | 0% | 256 | 272 | 0% | 1182 | 1374 | 1% |
| Week 1 | 3031 | 1680 | 0% | 328 | 424 | 0% | 1302 | 1760 | 2% |
| Week 2 | 2951 | 1716 | 0% | 291 | 440 | 0% | 1464 | 2028 | 4% |
| Week 3 | 2671 | 1844 | — | 368 | 508 | — | 1460 | 2486 | — |
| Week 4 | 3295 | 1672 | 1% | 424 | 480 | 1% | 1742 | 3354 | 8% |

*Brookfield viscosity with Spindles 3 or 4 and 30 rpm

Example 11

The high solids slurries were produced following two procedures. The standard procedure involves preparation of the final slurry composition by incorporating the individual components one after the other, with a minimum mixing time between the components addition.

The preferred procedure of the present disclosure involves making a stable concentrated slurry base that accounts for about 20 wt. % of the total final slurry composition. One such concentrated slurry base (Example 11) was prepared, which demonstrated excellent viscosity stability over time as presented in Table 13. The viscosity after four weeks at ambient temperature remained very consistent.

TABLE 13

| Concentrated slurry base | |
|---|---|
| Compound | Example 11 |
| EFC CRYSTAL 250 | 76.90% |
| CLAYTONE AF | 10.00% |
| JEFFSOL PC | 3.10% |
| AMIET 505 | 10.00% |
| Stability Conditions | Viscosity @ Ambient temp.*, cPs |
| Initial viscosity (After preparation) | 1,380 |
| 24 hours After Preparation | 1,632 |
| Week 1 | 1,548 |
| Week 2 | 1,568 |
| Week 3 | 1,484 |
| Week 4 | 1,564 |

*Brookfield viscosity with Spindles 3 or 4 and 30 rpm

Example 12

Example 12 is a high solids slurry composition formulated with a polyacrylamide friction reducer (FR-3), in which the slurry composition was formed from the concentrated slurry base of Example 11. The concentrated slurry base of Example 11 (20 wt. %) was diluted down with the same amount of EFC CRYSTAL 250 (20 wt. %), then 60 wt. % FR-3 friction reducer was incorporated into the diluted slurry base under mixing, and mixed sufficiently to produce a homogeneous and stable slurry composition having a reasonably low viscosity (Table 14).

TABLE 14

| Friction reducer slurry from concentrated slurry base | |
|---|---|
| Compound | Example 12 |
| Example 11 | 20.00% |
| EFC CRYSTAL 250 | 20.00% |
| FR-3 Friction reducer | 60.00% |
| Brookfield viscosity (#3/30 rpm), cPs | 1,374 |

The slurry composition of Example 12 was further evaluated for hydration compared to the dry friction reducer FR-3 alone. The FIGURE shows that the hydration rate of the slurry composition follows the hydration profile of the dry friction reducer, however the slurried system improves the level of ultimate viscosity achieved over the powder alone. This data indicates that the slurry helps speed up the hydration of the polymer. The hydration rate test was conducted at a concentration of 4 gallons slurry per thousand gallons fresh water (4 gptg) (corresponding to 20.8 pounds per thousand gallons (pptg) active polymer); 2 ml FR slurry composition (or 1.2 gms dry FR-3) were mixed into 500 ml water at 1,400 rpm for 60 seconds. Then the solution was transferred into a FANN viscometer cup, and viscosity recorded for 20 minutes.

Example 13

During the development of this technology, a large quality variation in commercially available friction reducers was noticed. This quality variation had a significant impact on the resulting high solids slurry composition quality/stability. The quality was observed to depend on the manufacturer and country of origin. In fact, commercially available friction reducers have large variation in terms of composition, and of the morphology of the polymer particles. This variation has an impact on the long term slurry stability. Certain friction reducing powders produced slurries that have a tendency to gel over time, and show poor freeze/thaw stability.

Example 13 was made through a dilution of the concentrated base slurry of Example 11 using FR-2. The slurry of Example 13 was evaluated for storage stability at ambient temperature and 40° C., as well as for freeze/thaw stability over three cycles. Table 15 shows that the slurry of Example 13 was relatively stable after storage at ambient temperature for four weeks, but the viscosity started increasing after two weeks at 40° C., though it still remained in an acceptable range. Excellent freeze and thaw stability of Example 13 was observed even after three freeze/thaw cycles.

TABLE 15

Long term storage and freeze/thaw stability

| Component | Example 13 | |
| --- | --- | --- |
| Example 11 | 20.00% | |
| EFC CRYSTAL 250 | 20.00% | |
| FR-2 | 60.00% | |
| Stability Conditions | Viscosity @ Ambient temp.*, cPs | Viscosity @ 40° C.*, cPs |
| Initial viscosity (After preparation) | 1,060 | — |
| Week 1 | 1,140 | 1,364 |
| Week 2 | 1,252 | 1,644 |
| Week 3 | 1,280 | 1,882 |
| Week 4 | 1,346 | 2,148 |

| Freeze/Thaw stability | Initial viscosity | After 1$^{st}$ F/T cycle | After 2$^{nd}$ F/T cycle | After 3$^{rd}$ F/T cycle |
| --- | --- | --- | --- | --- |
| Brookfield Viscosity, cPs | 1,060 | 1,268 | 1,292 | 1,376 |

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A slurry composition, comprising:
(A) a solvent;
(B) a suspension aid;
(D) an alkoxylated fatty amine; and
(E) an active ingredient,
wherein the suspension aid is a smectite-type clay modified with a quaternary ammonium cation, and
wherein the slurry composition is free of water or comprises less than 0.5 wt. % water relative to a total weight of the slurry composition.

2. The slurry composition of claim 1, wherein the solvent (A) is a hydrocarbon solvent.

3. The slurry composition of claim 1, wherein the solvent (A) is present in an amount of 10 to 70 wt. %, based on a total weight of the slurry composition.

4. The slurry composition of claim 1, wherein the suspension aid (B) is present in an amount of 0.1 to 15 wt. %, based on a total weight of the slurry composition.

5. The slurry composition of claim 1, further comprising at least one polar activator (C) selected from the group consisting of water, an alkylene carbonate, and a $C_1$ to $C_8$ monoalcohol.

6. The slurry composition of claim 5, wherein the polar activator (C) of water, if present, has a concentration of 0.02 to less than 0.5 wt. %, and
wherein the polar activator (C) of the alkylene carbonate and/or the $C_1$ to $C_8$ monoalcohol if present, has a concentration of 0.02 to 10 wt. %, based on a total weight of the slurry composition.

7. The slurry composition of claim 1, wherein the alkoxylated fatty amine (D) is an ethoxylated fatty amine.

8. The slurry composition of claim 1, wherein the alkoxylated fatty amine (D) is an ethoxylated fatty monoamine or an ethoxylated fatty diamine.

9. The slurry composition of claim 1, wherein the alkoxylated fatty amine (D) is present in an amount of 0.1 to 10 wt. %, based on a total weight of the slurry composition.

10. The slurry composition of claim 1, wherein the active ingredient (E) is at least one organic polymer (E1) selected from the group consisting of a polyacrylamide, a guar gum, a hydroxyethyl cellulose, a methyl hydroxyethyl cellulose, a carboxymethyl cellulose, and a xanthan gum, or at least inorganic material (E2) selected from the group consisting of calcium carbonate, tricalcium phosphate, dicalcium phosphate, titanium oxide, calcium oxide, calcium hydroxide, sodium carbonate, sodium bicarbonate, and ulexite.

11. The slurry composition of claim 1, wherein the active ingredient (E) is present in an amount of up to 75 wt. %, based on a total weight of the slurry composition.

12. The slurry composition of claim 1, wherein the active ingredient (E) is present in an amount of 46 to 60 wt. %, based on a total weight of the slurry composition.

13. The slurry composition of claim 1, which is in the form of a suspension having an initial viscosity of less than 5,000 cP, and when aged at a temperature of up to 40° C. for at least 4 weeks, (i) remains in suspended foil with less than 5 wt. % phase separation, and (ii) maintains a viscosity of less than 5,000 cP.

14. A method of treating a subterranean formation, comprising:
mixing an aqueous fluid with the slurry composition of claim 1 to form a treatment fluid; and
introducing the treatment fluid through a wellbore penetrating the subterranean formation.

15. The method of claim 14, wherein the treatment fluid is a drilling fluid, a cementing fluid, a completion fluid, a workover fluid, or a stimulation fluid.

16. A concentrated slurry base, comprising:
(A) a solvent;
(B) a suspension aid;
(C) a polar activator; and
(D) an alkoxylated fatty amine,
wherein the suspension aid is a smectite-type clay modified with a quaternary ammonium cation, and
wherein the concentrated slurry base is free of or comprises less than 0.5 wt % of water, polyacrylamide, guar gum, hydroxyethyl cellulose, methyl hydroxyethyl cellulose, carboxymethyl cellulose, xanthan gum, calcium carbonate, tricalcium phosphate, dicalcium phosphate, titanium oxide, calcium oxide, calcium hydroxide, sodium carbonate, sodium bicarbonate, and ulexite, each based on a total weight of the concentrated slurry base.

17. The concentrated slurry base of claim 16, wherein
the solvent (A) is present in an amount of 50 to 85 wt. %,
the suspension aid (B) is present in an amount of 1 to 20 wt. %,
the polar activator (C) is present in an amount of 0.1 to 15 wt. %, and
the alkoxylated fatty amine (D) is present in an amount of 1 to 30 wt. %,
each based on a total weight of the concentrated slurry base.

18. The concentrated slurry base of claim 16, wherein the alkoxylated fatty amine (D) is an ethoxylated fatty monoamine or an ethoxylated fatty diamine.

\* \* \* \* \*